United States Patent
Kwon et al.

(10) Patent No.: US 8,774,715 B2
(45) Date of Patent: Jul. 8, 2014

(54) MOBILE TERMINAL

(75) Inventors: Taejung Kwon, Seoul (KR); Kyunglang Park, Seoul (KR); Byonggyo Lee, Seoul (KR); Sungho Woo, Seoul (KR)

(73) Assignee: LG Electronics Inc., Seoul (KR)

( * ) Notice: Subject to any disclaimer, the term of this patent is extended or adjusted under 35 U.S.C. 154(b) by 210 days.

(21) Appl. No.: 13/369,022

(22) Filed: Feb. 8, 2012

(65) Prior Publication Data

US 2012/0295541 A1 Nov. 22, 2012

(30) Foreign Application Priority Data

May 18, 2011 (KR) .................. 10-2011-0046876

(51) Int. Cl.
*H04B 5/00* (2006.01)

(52) U.S. Cl.
USPC .................. 455/41.1; 455/41.2; 455/68

(58) Field of Classification Search
CPC ................................................... H04W 76/02
USPC .................... 455/41.1, 41.2, 68, 525
See application file for complete search history.

(56) References Cited

U.S. PATENT DOCUMENTS

2009/0191811 A1* 7/2009 Griffin et al. ............... 455/41.1
2011/0124287 A1* 5/2011 Bang et al. .................. 455/41.2

* cited by examiner

*Primary Examiner* — Tuan H Nguyen
(74) *Attorney, Agent, or Firm* — Birch, Stewart, Kolasch & Birch, LLP

(57) ABSTRACT

Disclosed is a mobile terminal. The terminal may include a first communication module for establishing a first communication link with a data storage device, a second communication module for establishing a second communication link with the other electronic device, a third communication module for establishing a third communication link with the other electronic device, and a controller for controlling the second communication module so that the second communication module establishes the second communication link by using first link configuration information received from the data storage device through the first communication link and for then sharing second link configuration information for establishing the third communication link with the other electronic device through the second communication link.

20 Claims, 19 Drawing Sheets

MOBILE TERMINAL

This application claims the benefit of Korean Patent Application No. 10-2011-0046876 filed on May 18, 2011 which are hereby incorporated by reference.

BACKGROUND

1. Field

The present invention relates to a mobile terminal and, more particularly, to a mobile terminal which is capable of establishing a plurality of communication links with other electronic devices by using link information stored in a data storage device.

2. Related Art

As the function of a terminal, such as a personal computer, a notebook, a mobile phone, and a smart phone, is diversified, the terminal is being implemented into a multimedia player equipped with complex functions, such as taking a photograph or capturing a moving image, playing music or a moving image file, playing a game, and receiving broadcasting.

In order to support and enhance the functions of the terminal, the improvement of a structural part or a software part or both of the terminal may be taken into consideration. As a variety of terminals including a mobile terminal are recently providing complex and various functions, a menu structure becomes complicated.

Recently, there is an explosive increase of an interest in and demand for technology which can perform mobile payment, implementation of a home network, smart poster, bus ticketing, and data communication with other electronic devices by incorporating near-field wireless communication technology into a mobile terminal.

SUMMARY

A mobile terminal according to the present invention is advantageous in that the mobile terminal establishes a communication link with a data storage device and then establishing a plurality of communication links with other electronic devices at the same time on the basis of link configuration information received from the data storage device through the communication link.

A mobile terminal according to an embodiment of the present invention may include a first communication module, a second communication module, a third communication module, and a controller. The first communication module may establish a first communication link with a data storage device. The second communication module may establish a second communication link with the other electronic device. The third communication module may establish a third communication link with the other electronic device. The controller may control the second communication module so that the second communication module establishes the second communication link by using first link configuration information received from the data storage device through the first communication link and then share second link configuration information for establishing the third communication link with the other electronic device through the second communication link.

A mobile terminal according to another embodiment of the present invention may include a first communication module, a plurality of second communication modules, and a controller. The first communication module may establish a first communication link with a data storage device. The plurality of second communication modules may establish a plurality of second communication links with the other electronic device. The controller may establish one of the plurality of second communication links based on first link configuration information received from the data storage device through the first communication link and then sequentially establish the remaining second communication links of the plurality of second communication links according to the predetermined order of priority. Here, the controller may share second link configuration information, used to establish the remaining second communication links through the established second communication link, with the other electronic device.

BRIEF DESCRIPTION OF THE DRAWINGS

The accompany drawings, which are included to provide a further understanding of this document and are incorporated on and constitute a part of this specification illustrate embodiments of this document and together with the description serve to explain the principles of this document.

DETAILED DESCRIPTION OF THE EMBODIMENTS

The present invention will now be described more fully with reference to the accompanying drawings, in which exemplary embodiments of the invention are shown. The invention may, however, be embodied in many different forms and should not be construed as being limited to the embodiments set forth herein; rather, there embodiments are provided so that this disclosure will be thorough and complete, and will fully convey the concept of the invention to those skilled in the art.

Hereinafter, a mobile terminal relating to the present invention will be described below in more detail with reference to the accompanying drawings. In the following description, suffixes "module" and "unit" are given to components of the mobile terminal in consideration of only facilitation of description and do not have meanings or functions discriminated from each other.

The mobile terminal described in the specification can include a cellular phone, a smart phone, a laptop computer, a digital broadcasting terminal, personal digital assistants (PDA), a portable multimedia player (PMP), a navigation system and so on.

Figure 1:
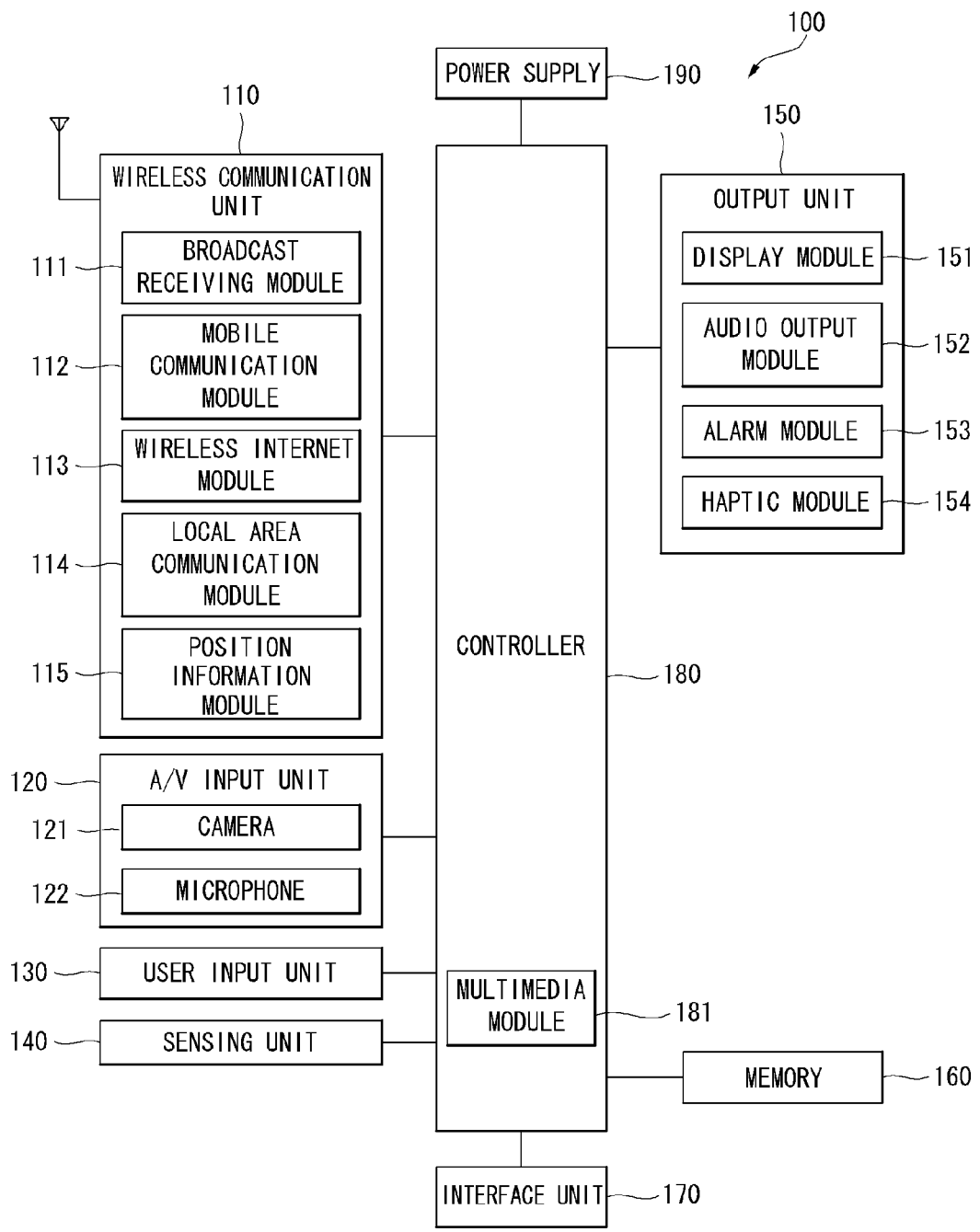
FIG. 1 is a block diagram of a mobile terminal according to an embodiment of the present invention.

FIG. 1 is a block diagram of an implementation of a mobile terminal 100. The mobile terminal 100 can include a radio communication unit 110, an audio/video (100 input unit 120, a user input unit 130, a sensing unit 140, an output unit 150, a memory 160, an interface 170, a controller 180, and a power supply 190. The components shown in FIG. 1 are not essential parts and the number of components included in the mobile terminal can be varied.

The components of the mobile terminal will now be described.

The radio communication unit 110 can include at least one module that enables radio communication between the mobile terminal 100 and a radio communication system or between the mobile terminal 100 and a network in which the mobile terminal 100 is located. For example, the radio communication unit 110 can include a broadcasting receiving module 111, a mobile communication module 112, a wireless Internet module 113, a local area communication module 114 and a position information module 115.

The broadcasting receiving module 111 receives broadcasting signals and/or broadcasting related information from an external broadcasting management server through a broadcasting channel.

The broadcasting channel can include a satellite channel and a terrestrial channel. The broadcasting management server can be a server that generates and transmits broadcasting signals and/or broadcasting related information or a server that receives previously created broadcasting signals and/or broadcasting related information and transmits the broadcasting signals and/or broadcasting related information to a terminal. The broadcasting signals can include not only TV broadcasting signals, radio broadcasting signals and data broadcasting signals but also signals in the form of combination of a TV broadcasting signal and a radio broadcasting signal.

The broadcasting related information can be information on a broadcasting channel, a broadcasting program or a broadcasting service provider. The broadcasting related information can be provided even through a mobile communication network. In this case, the broadcasting related information can be received by the mobile communication module 112.

The broadcasting related information can exist in various forms. For example, the broadcasting related information can exist in the form of electronic program guide (EPG) of digital multimedia broadcasting (DMB) or in the form of electronic service guide (ESG) of digital video broadcast-handheld (DVB-H).

The broadcasting receiving module 111 receives broadcasting signals using various broadcasting systems. Particularly, the broadcasting receiving module 111 can receive digital broadcasting signals using digital broadcasting systems such as digital multimedia broadcasting-terrestrial (DMB-T), digital multimedia broadcasting-satellite (DMB-S), media forward link only (MediaFLO), DVB-H and integrated services digital broadcast-terrestrial (ISDB-T) systems. The broadcasting receiving module 111 can be constructed to be suited to broadcasting systems providing broadcasting signals other than the above-described digital broadcasting systems.

The broadcasting signals and/or broadcasting related information received through the broadcasting receiving module 111 can be stored in the memory 160. The mobile communication module 112 transmits/receives a radio signal to/from at least one of a base station, an external terminal and a server on a mobile communication network. The radio signal can include a voice call signal, a video telephony call signal or data in various forms according to transmission and receiving of text/multimedia messages.

The wireless Internet module 113 means a module for wireless Internet access and can be included in the mobile terminal 100 or externally attached to the mobile terminal 100. Wireless LAN (WLAN) (Wi-Fi), wireless broadband (Wibro), world interoperability for microwave access (Wimax), high speed downlink packet access (HSDPA) and so on can be used as a wireless Internet technique. The local area communication module 114 means a module for local area communication. Bluetooth, radio frequency identification (RFID), infrared data association (IrDA), ultra wideband (UWB) and ZigBee can be used as a local area communication technique.

Figure 2:
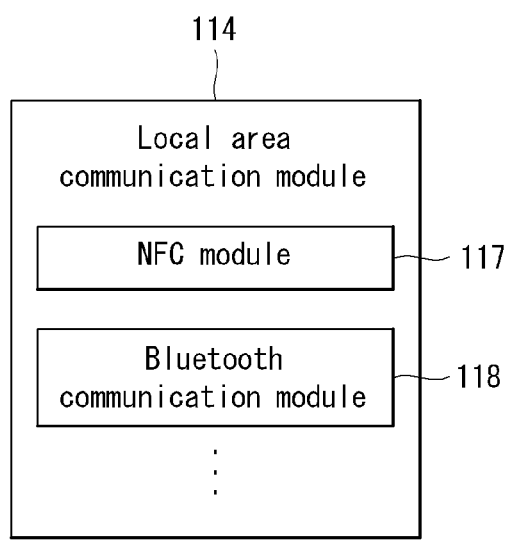
FIG. 2 is a detailed block diagram of the local area communication module of the mobile terminal according to an embodiment of the present invention.

FIG. 2 is a detailed block diagram of the local area communication module 114 of the mobile terminal 100 according to an embodiment of the present invention. Referring to FIG. 2, the local area communication module 114 may include a Near Field Communication (NFC) communication module 117, a Bluetooth communication module 118, and so on.

The NFC module 117 may perform data communication with devices which are placed within 10 cm (preferably within 4 cm) by using very short-range contactless data transfer technology related to Radio Frequency Identification (RFID). An electronic device adopting NFC technology may communicate with other electronic devices which adopt the NFC technology by using at least one of, for example, a reader mode, a card emulation mode, and a peer to peer mode. The NFC module 117 will be described in more detail below with reference to FIG. 3.

The Bluetooth communication module 118 may perform data communication with devices which are placed within a radius of 10 to 100 m by using Bluetooth (i.e., one of the local area wireless communication standards). For reference, Bluetooth is a local area wireless networking technique jointly developed by the Special Interest Group (SIS) which was established by five companies; Ericsson, Nokia, IBM, Intel, and Toshiba.

The block diagram of FIG. 2 is only an example of the local area communication module 114 of the mobile terminal 100 according to the present invention. The elements of the local area communication module 114 are not indispensable, and the local area communication module 114 may include greater or smaller elements than the elements shown in FIG. 2.

The position information module 115 confirms or obtains the position of the mobile terminal. A global positioning system (GPS) module is a representative example of the position information module 115. According to the current technology, the GPS module 115 can calculate information on distances between one point (object) and at least three satellites and information on the time when the distance information is measured and apply trigonometry to the obtained distance information to obtain three-dimensional position information on the point (object) according to latitude, longitude and altitude at a predetermined time.

Furthermore, a method of calculating position and time information using three satellites and correcting the calculated position and time information using another satellite is also used. In addition, the GPS module 115 continuously calculates the current position in real time and calculates velocity information using the position information.

Referring to FIG. 1, the A/V input unit 120 is used to input an audio signal or a video signal and can include a camera 121 and a microphone 122. The camera 121 processes image frames of still images or moving images obtained by an image sensor in a video telephony mode or a photographing mode. The processed image frames can be displayed on a display module 151.

The image frames processed by the camera 121 can be stored in the memory 160 or transmitted to an external device through the radio communication unit 110. The mobile terminal 100 can include at least two cameras according to constitution of the terminal.

The microphone 122 receives an external audio signal in a call mode, a recording mode or a speed recognition mode and processes the received audio signal into electric audio data. The audio data can be converted into a form that can be transmitted to a mobile communication base station through the mobile communication module 112 and output in the call mode. The microphone 122 can employ various noise removal algorithms for removing noise generated when the external audio signal is received.

The user input unit 130 receives input data for controlling the operation of the terminal from a user. The user input unit 130 can include a keypad, a dome switch, a touch pad (constant voltage/capacitance), jog wheel, jog switch and so on.

The sensing unit 140 senses the current state of the mobile terminal 100, such as open/close state of the mobile terminal 100, the position of the mobile terminal 100, whether a user touches the mobile terminal 100, the direction of the mobile terminal 100 and acceleration/deceleration of the mobile terminal 100 and generates a sensing signal for controlling the operation of the mobile terminal 100. For example, the sensing unit 140 can sense whether a slide phone is opened or closed when the mobile terminal 100 is the slide phone. Furthermore, the sensing unit 140 can sense whether the power supply 190 supplies power and whether the interface 170 is connected to an external device. The sensing unit 140 can include a proximity sensor.

The output unit 150 generates visual, auditory or tactile output and can include the display module 151, an audio output module 152, an alarm module 153 and a haptic module 154.

The display module 151 displays information processed by the mobile terminal 100. For example, the display module 151 displays UI or graphic user interface (GUI) related to a telephone call when the mobile terminal is in the call mode. The display module 151 displays a captured or/and received image, UI or GUI when the mobile terminal 100 is in the video telephony mode or the photographing mode.

The display module 151 can include at least one of a liquid crystal display, a thin film transistor liquid crystal display, an organic light-emitting diode display, a flexible display and a three-dimensional display.

Some of these displays can be of a transparent type or a light transmission type. This can be referred to as a transparent display. The transparent display includes a transparent liquid crystal display. The rear structure of the display module 151 can also be of the light transmission type. According to this structure, a user can see an object located behind the body of the mobile terminal 100 through an area of the body of the mobile terminal 100, which is occupied by the display module 151.

The mobile terminal 100 can include at least two display modules 151 according to constitution of the terminal. For example, the mobile terminal 100 can include a plurality of displays that are arranged on a single face at a predetermined distance or integrated. Otherwise, the plurality of displays can be arranged on different sides.

In the case where the display module 151 and a sensor sensing touch (referred to as a touch sensor hereinafter) form a layered structure, which is referred to as a touch screen hereinafter, the display module 151 can be used as an input device in addition to an output device. The touch sensor can be in the form of a touch film, a touch sheet and a touch pad, for example.

The touch sensor can be constructed such that it converts a variation in pressure applied to a specific portion of the display module 151 or a variation in capacitance generated at a specific portion of the display module 151 into an electric input signal. The touch sensor can be constructed such that it can sense pressure of touch as well as the position and area of touch.

When touch input is applied to the touch sensor, a signal corresponding to the touch input is transmitted to a touch controller. The touch controller processes the signal and transmits data corresponding to the processed signal to the controller 180. Accordingly, the controller 180 can detect a touched portion of the display 151.

Referring to FIG. 1, the proximity sensor 141 can be located in an internal region of the mobile terminal, surrounded by the touch screen, or near the touch screen. The proximity sensor senses an object approaching a predetermined sensing face or an object located near the proximity sensor using electromagnetic force or infrared rays without having mechanical contact. The proximity sensor has lifetime longer than that of a contact sensor and has wide application.

The proximity sensor includes a transmission type photo-electric sensor, a direct reflection type photo-electric sensor, a mirror reflection type photo-electric sensor, a high-frequency oscillating proximity sensor, a capacitive proximity sensor, a magnetic proximity sensor, an infrared proximity sensor, etc.

A capacitive touch screen is constructed such that proximity of a pointer is detected through a variation in an electric field according to the proximity of the pointer. In this case, the touch screen (touch sensor) can be classified as a proximity sensor.

For convenience of explanation, an action of approaching the pointer to the touch screen while the pointer it not being in contact with the touch screen such that location of the pointer on the touch screen is recognized is referred to as "proximity touch" and an action of bring the pointer into contact with the touch screen is referred to as "contact touch" in the following description. A proximity touch point of the pointer on the touch screen means a point of the touch screen to which the pointer corresponds perpendicularly to the touch screen when the pointer proximity-touches the touch screen.

The proximity sensor senses proximity touch and a proximity touch pattern (for example, a proximity touch distance, a proximity touch direction, a proximity touch velocity, a proximity touch time, a proximity touch position, a proximity touch moving state, etc.). Information corresponding to the sensed proximity touch action and proximity touch pattern can be displayed on the touch screen.

The audio output module 152 can output audio data received from the radio communication unit 110 or stored in the memory 160 in a call signal receiving mode, a telephone call mode or a recording mode, a speech recognition mode and a broadcasting receiving mode. The audio output module 152 outputs audio signals related to functions (for example, a call signal incoming tone, a message incoming tone, etc.) performed in the mobile terminal 100. The audio output module 152 can include a receiver, a speaker, a buzzer, etc.

The alarm module 153 outputs a signal for indicating generation of an event of the mobile terminal 100. Examples of events generated in the mobile terminal include receiving of a call signal, receiving of a message, input of a key signal, input of touch, etc. The alarm module 153 can output signals in forms different from video signals or audio signals, for example, a signal for indicating generation of an event through vibration. The video signals or the audio signals can be also output through the display module 151 or the audio output module 152.

The haptic module 154 generates various haptic effects that the user can feel. A representative example of the haptic effects is vibration. The intensity and pattern of vibration generated by the haptic module 154 can be controlled. For example, different vibrations can be combined and output or sequentially output.

The haptic module 154 can generate a variety of haptic effects including an effect of stimulus according to arrangement of pins vertically moving for a contact skin face, an effect of stimulus according to jet force or sucking force of air through a jet hole or a sucking hole, an effect of stimulus rubbing the skin, an effect of stimulus according to contact of an electrode, an effect of stimulus using electrostatic force and an effect according to reproduction of cold and warmth using an element capable of absorbing or radiating heat in addition to vibrations.

The haptic module 154 can not only transmit haptic effects through direct contact but also allow the user to feel haptic effects through kinesthetic sense of his fingers or arms. The mobile terminal 100 can include at least two haptic modules 154 according to constitution of the mobile terminal.

The memory 160 can store a program for the operation of the controller 180 and temporarily store input/output data (for example, phone book, messages, still images, moving images, etc.). The memory 160 can store data about vibrations and sounds in various patterns, which are output from when a touch input is applied to the touch screen.

The memory 160 can include at least one of a flash memory, a hard disk type memory, a multimedia card micro type memory, a card type memory (for example, SD or XD memory), a random access memory (RAM), a static RAM (SRAM), a read-only memory (ROM), an electrically erasable programmable ROM (EEPROM), a programmable ROM (PROM) magnetic memory, a magnetic disk and an optical disk. The mobile terminal 100 can operate in relation to a web storage performing the storing function of the memory 160 on the Internet.

The interface 170 serves as a path to all external devices connected to the mobile terminal 100. The interface 170 receives data from the external devices or power and transmits the data or power to the internal components of the mobile terminal 100 or transmits data of the mobile terminal 100 to the external devices.

The interface 170 can include a wired/wireless headset port, an external charger port, a wired/wireless data port, a memory card port, a port for connecting a device having a user identification module, an audio I/O port, a video I/O port, an earphone port, etc., for example.

An identification module is a chip that stores information for authenticating the authority to use the mobile terminal 100 and can include a user identify module (UIM), a subscriber identify module (SIM) and a universal subscriber identify module (USIM). A device (referred to as an identification device hereinafter) including the identification module can be manufactured in the form of a smart card. Accordingly, the identification device can be connected to the mobile terminal 100 through a card slot included in the interface 170.

The construction of the mobile terminal 100 according to the present invention has been described above with reference to FIGS. 1 and 2. Characteristics of the mobile terminal 100 according to the present invention which can establish a plurality of communication links with other electronic devices are described in more detail.

Figure 3:
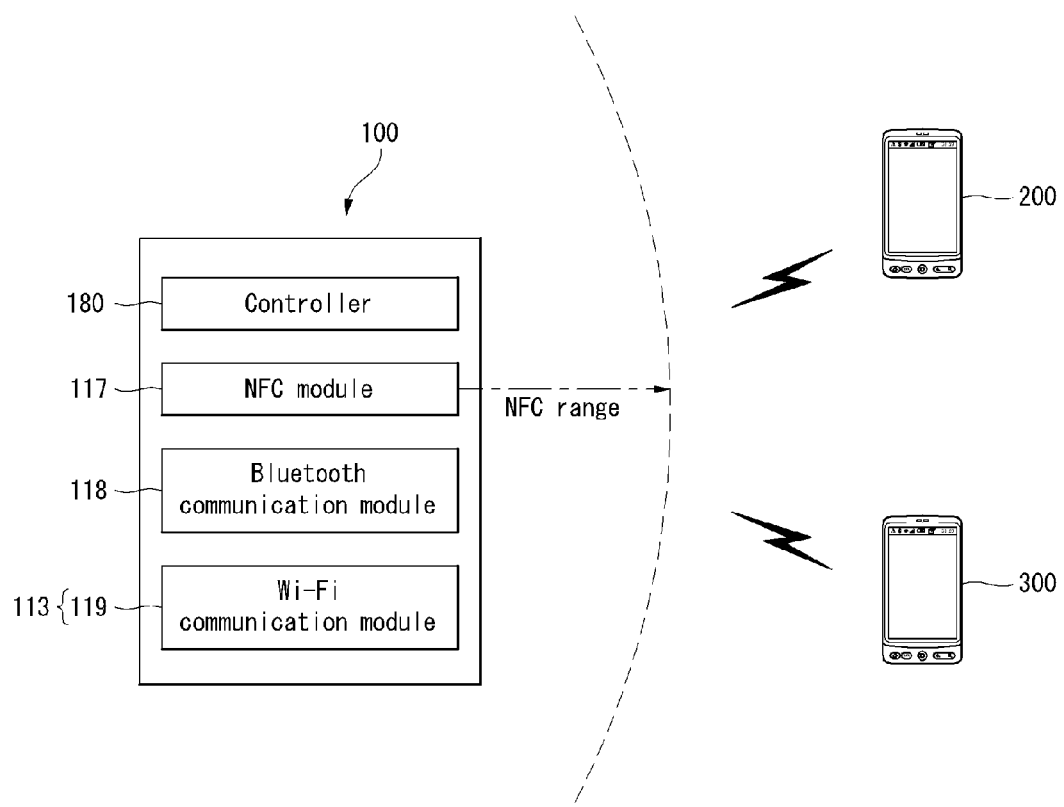
FIG. 3 is a diagram showing a system environment including the mobile terminal according to the embodiment of the present invention.

FIG. 3 is a diagram showing a system environment including the mobile terminal 100 according to the embodiment of the present invention. From FIG. 3, it can be seen that the system environment includes the mobile terminal 100 according to the present invention and one or more electronic devices 200 and 300 which can establish an NFC link with the mobile terminal 100.

The elements of the system environment are not indispensable, and the system environment may include greater or smaller elements than the elements shown in FIG. 3. Only elements necessary to describe a characteristic that the mobile terminal 100 establishes the communication links are simply shown in FIG. 3.

Although the system environment is formed of the mobile terminals 100, 200, and 300 in FIG. 3, the electronic devices 100, 200, and 300 described in this specification may be specific electronic devices supporting NFC. In other words, the other electronic devices 100, 200, and 300 may be mobile terminals, such as a handheld phone, a smart phone, and a tablet PC which support NFC, but may be electronic devices such as a printer, TV, DTV, a computer, and an audio device. An electronic device having the NFC function may be hereinafter called an NFC electronic device.

Furthermore, in FIG. 3, the mobile terminal 100 may establish NFC links with the other electronic devices 200 and 300 on the basis of NFC technology which is a kind of local area communication technology, but the scope of the present invention is not limited thereto. For example, the mobile terminal 100 may establish wireless communication links with the other electronic devices 200 and 300 by using near-field wireless communication technology in addition to the NFC technology.

Referring back to FIG. 3, the mobile terminal 100 includes a controller 180, an NFC module 117, a Bluetooth communication module 118, and a Wi-Fi communication module 119.

The controller 180 may control the elements of the mobile terminal 100. The NFC module 117 may enable the mobile terminal 100 to establish NFC links with the other electronic devices 200 and 300 supporting NFC. The NFC module 117 may refer to an NFC Forum device. In this specification, the NFC module may also be called local area communication means.

The NFC module 117, as shown in FIG. 3, may establish the NFC links with the NFC modules of the other electronic devices 200 and 300 through tagging within an NFC range.

The NFC module 117 may communicate with the NFC modules of the other electronic devices 200 and 300 by using various modes. For example, the various modes may include a card emulation mode, a reader mode, and a peer to peer mode.

If the NFC module 117 is operated in the card emulation mode, the NFC module 117 of the mobile terminal 100 may function as a card, in other words, a tag. In this case, the NFC modules of the other electronic devices 200 and 300 may be operated in the reader mode, thus obtaining data from the NFC module 117 of the mobile terminal 100.

If the NFC module 117 is operated in the reader mode, the NFC module 117 of the mobile terminal 100 may function as a reader. In this case, the NFC module 117 of the mobile terminal 100 may be operated in the emulation mode, thus obtaining data from the NFC modules of the other electronic devices 200 and 300.

If the NFC module 117 is operated in the peer to peer mode, the NFC module 117 of the mobile terminal 100 and the NFC modules of the other electronic devices 200 and 300 may exchange data.

A mode of the NFC module 117 may be determined according to predetermined criteria. For example, a mode of the NFC module 117 may be set according to a user's input or a predetermined algorithm.

The mobile terminal 100 may establish the NFC links with the other electronic devices 200 and 300 through the NFC module 117 and then establish a communication link different from the NFC link with the other electronic devices 200 and 300 through the Bluetooth communication module 118 or the Wi-Fi communication module 119 or both. In this case, although the NFC link is disconnected, the mobile terminal 100 may continue to perform data communication with the other electronic devices 200 and 300 through the Bluetooth communication link or the Wi-Fi communication link or both.

In this specification, a series of processes of establishing communication links so that the mobile terminal 100 and the other electronic devices 200 and 300 can communicate with each other using other wireless communication technologies, after the NFC links are established, is called handover.

Referring back to FIG. 3, handover from the NFC link to the Bluetooth communication link and the Wi-Fi communication link may be performed in the mobile terminal 100 according to the present invention, but the scope of the present invention is not limited thereto. For example, the mobile terminal 100 may perform the handover from the NFC link to a variety of communication links, such as a Radio Frequency Identification (RFID) communication link and a Wireless Gigabit (WiGig) communication link.

Although not shown in FIG. 3, the other electronic devices 200 and 300 may include elements comparable to the mobile terminal 100. In other words, each of the other electronic devices 200 and 300 may include a controller, an NFC module, a Bluetooth communication module, and a Wi-Fi communication module.

In other words, the handover means that the mobile terminal 100 establishes the NFC links with the other electronic devices 200 and 300 and then establishes other communication links in order to perform data communication. A user may easily establish the NFC links through NFC tagging between the mobile terminal 100 and the other electronic devices 200 and 300 and then change communication means by using an alternative communication link which is suitable for a longer distance or a higher-capacity data transfer than the NFC link.

A handover process of the mobile terminal 100 according to the present invention is described in more detail with reference to the drawings. Reference will be made to the system environment shown in FIG. 3, for convenience of description. This is, however, only for convenience of description and the technical spirit of the present invention is not limited to a specific environment or a specific device.

Figure 4:
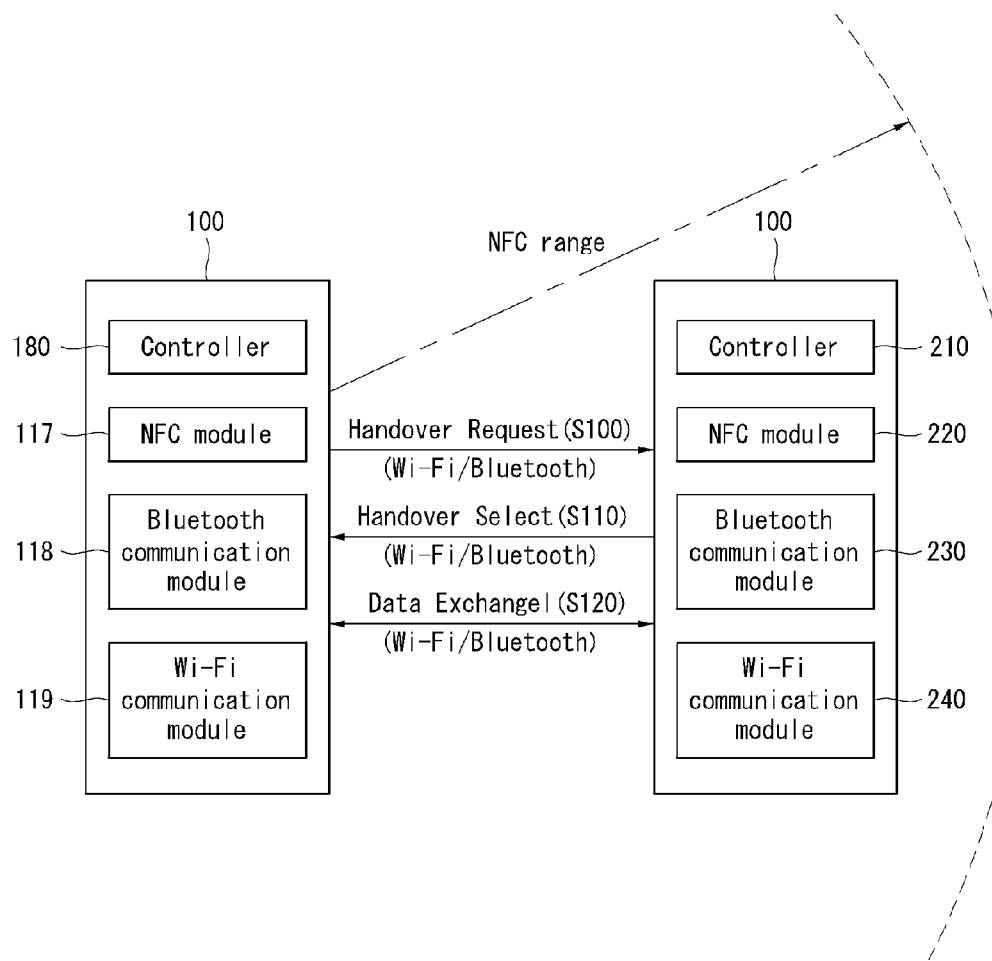
FIG. 4 shows an example where the mobile terminal according to the embodiment of the present invention establishes communication links with other electronic devices.

FIG. 4 shows an example where the mobile terminal 100 according to the embodiment of the present invention establishes communication links with the other electronic devices 200. The communication link establishment process is described below with reference to relevant drawings.

Referring to FIG. 4, the mobile terminal 100 may transmit a handover request message to the other electronic device 200 at step S110. Prior to the step of S110, the mobile terminal 100 and the other electronic device 200 may establish a communication link through first communication means. For example, as shown in FIG. 4, the mobile terminal 100 may establish an NFC link through tagging for NFC module 220 included in the other electronic device 200.

In the state where the NFC link has been established, the mobile terminal 100 may transmit a message for a handover request (e.g., the handover request message) to the other electronic device 200 through the NFC link.

When the mobile terminal 100 transmits the handover request message to the other electronic device 200, the mobile terminal 100 and the other electronic device 200 may initiate a protocol for establishing other communication links through the NFC link now being established between the mobile terminal 100 and the other electronic device 200.

Here, the mobile terminal 100 may have a status of a handover requester, and the other electronic device 200 may have a status of a handover selector. The handover requester may refer to a device that initiates a handover protocol by transmitting a handover request message to another NFC electronic device, and the handover selector may refer to an NFC device that configures a handover selection message in response to the received handover request message and makes a response.

The above concept is relative because the handover requester and the handover selector are determined according to whether the handover requester (i.e., a handover request device) and the handover selector (i.e. handover selection device) transmit the handover request message or the handover selection message. If the other electronic device 200 transmits a handover request message to the mobile terminal 100, the mobile terminal 100 may become a handover selector and the other electronic device 200 may become a handover requester.

The handover request message may include information about other communication modules supported by the mobile terminal 100. For example, as shown in FIG. 4, if the mobile terminal 100 supports Bluetooth and Wi-Fi, the handover request message may include information about Bluetooth and Wi-Fi which are supported by the mobile terminal 100.

The order of priority may be given to communication technology which is supported by the mobile terminal 100 and used in handover. For example, in the handover request message, information about a communication module supporting communication technology having a high order of priority may be written in the front, and information about a communication module supporting communication technology having a lower order of priority may be written in the rear, as shown in FIG. 4. The handover request message of FIG. 4 shows that information about a Wi-Fi communication module has a higher order of priority than information about a Bluetooth communication module.

The other electronic device 200 that has received the handover request message may transmit a response for the handover request message to the mobile terminal 100 at step S120. As an example of the response for the handover request message, the other electronic device 200 may generate a handover selection message and transmit the generated handover selection message to the mobile terminal 100 through the NFC link.

The other electronic device 200 may determine what communication modules are included in the mobile terminal 100 by analyzing the handover request message and may provide information about communication modules, included in the other electronic device 200, to the mobile terminal 100 according to the determination. Here, the information about the communication modules included in the handover selection message may include information about communication modules included in the other electronic device 200, from among the communication modules included in the mobile terminal 100.

From FIG. 4, it can be seen that the controller 210 of the other electronic device 200 determines that the Bluetooth communication module 118 and the Wi-Fi communication module 119 are included in the mobile terminal 100 by analyzing the received handover request message and transmits the handover selection message, including information about the Bluetooth communication module 230 and the Wi-Fi communication module 240 included in the other electronic device 200, to the mobile terminal 100.

When the handover selection message is received from the other electronic device 200, the controller 180 of the mobile terminal 100 may check that the Bluetooth communication module 230 and the Wi-Fi communication module 240 are included in the other electronic device 200 by analyzing the handover selection message and obtain information about the Bluetooth communication module 230 and the Wi-Fi communication module 240.

Next, the mobile terminal 100 may establish communication links with the communication module of the other electronic device 200 on the basis of the obtained information and perform data communication with the other electronic device 200 through the established communication link at step S120.

For example, the controller 180 of the mobile terminal 100 may be subjected to Bluetooth pairing with the other electronic device 200 in order to change the NFC link with the other electronic device 200 into a Bluetooth communication link. Accordingly, the mobile terminal 100 may continue to perform communication according to a Bluetooth protocol by switching the communication link with the other electronic device 200 from the NFC link to the Bluetooth communication link.

When the handover for the communication link between the mobile terminal 100 and the other electronic device 200 is performed from the NFC link to the Bluetooth communication link, there are advantages in that data communication is possible although the mobile terminal 100 and the other electronic device 200 are no longer placed within a range of the NFC shown in FIG. 4 and data can be exchanged at a higher transfer rate than that of the NFC link.

In other words, if the mobile terminal 100 is a smart phone, a user may bring the smart phone near the other electronic device 200, establish an NFC link with the other electronic device 200 by performing tagging with the other electronic device 200, and change communication means into a Bluetooth communication link by performing a handover protocol. Thus, although the smart phone of the user is deviated from an NFC range, the smart phone and the other electronic device 200 may continue to perform data communication through the Bluetooth communication link.

Furthermore, the controller 180 of the mobile terminal 100 may perform a process of establishing a Wi-Fi communication link with the other electronic device 200 in order to change the NFC link with the other electronic device 200 into the Wi-Fi communication link and perform data communication with the other electronic device 200 through the established Wi-Fi communication link. Accordingly, the mobile terminal 100 may perform data communication with the other electronic device 200 even the outside of the NFC range at a data transmission/reception speed than that of the NFC link.

If a plurality of communication links switched from the NFC link exists, the controller 180 of the mobile terminal 100 may perform handover for only a communication link selected from among the plurality of communication links or may perform handover for all the communication links. Furthermore, the controller 180 may select a communication link for handover, from among a plurality of communication links, according to the predetermined order of priority.

The process in which the mobile terminal 100 according to the present invention performs handover from a communication link (e.g., an NFC link) with a communication module included in the other electronic device 200 to at least one of communication links (e.g., a Bluetooth communication link and a Wi-Fi communication link) included in the other electronic device 200 has been described above with reference to FIGS. 3 and 4.

A process in which the mobile terminal 100 according to the embodiment of the present invention establishes a communication link with a data storage device in which information about communication modules included in the other electronic device is stored and then performs handover from the established communication link to a communication link with a communication module included in the other electronic device is described below.

Figure 5:
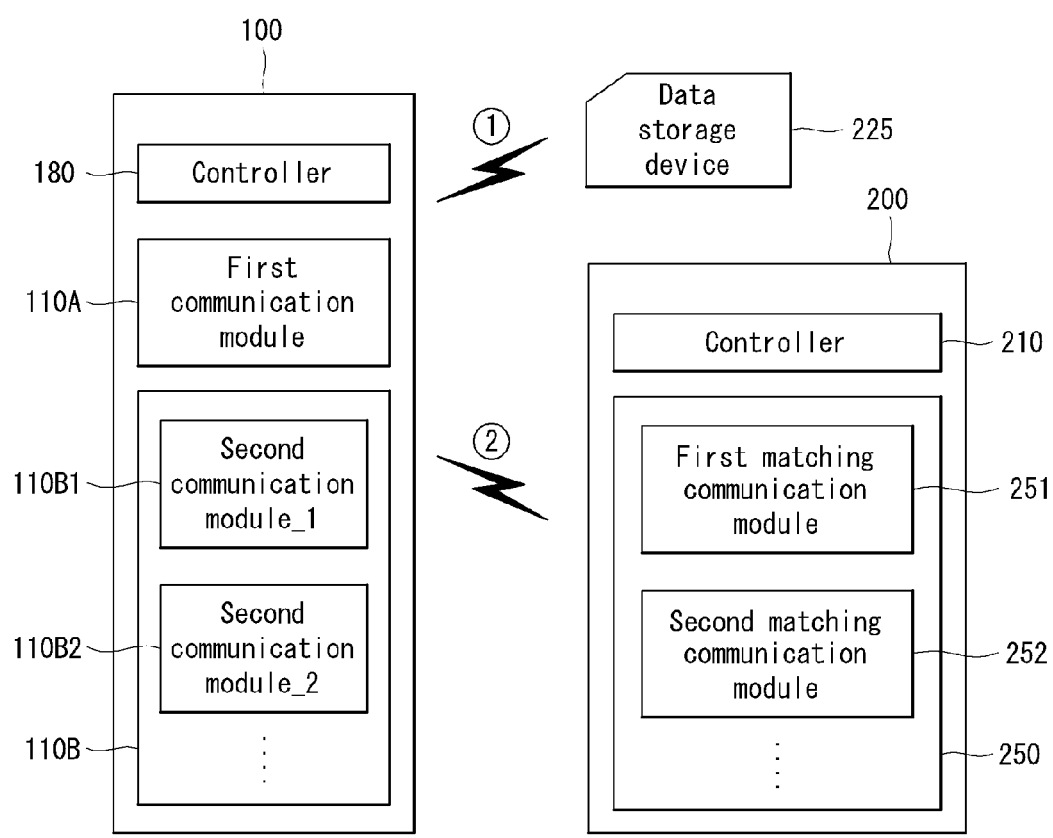
FIG. 5 shows another example where the mobile terminal according to the embodiment of the present invention establishes communication links with other electronic devices.

FIG. 5 shows another example where the mobile terminal 100 according to the embodiment of the present invention establishes communication links with the other electronic device 200. Referring to FIG. 5, the mobile terminal 100 includes a first communication module 110A, a second communication unit 110B, and a controller 180. For reference, like in FIG. 3, only elements necessary to describe a characteristic that the mobile terminal 100 establishes the communication links are simply shown in FIG. 5.

Furthermore, the other electronic device 200 includes a controller 210 and a communication unit 250. The controller 210 may control the overall operation of the other electronic device 200. The communication unit 250 may include a plurality of communication modules, such as a first matching communication module 251 and a second matching communication module 252 which are used to establish a plurality of second communication links with the mobile terminal 100.

The first communication module 110A may establish a first communication link with a data storage device 225 under the control of the controller 180. For example, if the distance to the data storage device 225 is shorter than a predetermined distance, the controller 180 may control the first communication module 110A so that the first communication module 110A establishes the first communication link with the data storage device 225. If the data storage device 225 is an NFC tag, the first communication module 110A may establish an NFC link with the NFC tag through NFC tagging under the control of the controller 180. Meanwhile, in embodiments according to the present invention, the data storage device 225 may be a device, such as the above NFC tag, an RFID tag, a barcode label, or a QR code label, and may include a variety of elements to be implemented in the future.

Data necessary to establish the first communication link may have been stored in the data storage device 225. For example, link configuration information used to establish an NFC link with the mobile terminal 100 may have been stored in the data storage device 225. Although the data storage device 225 is illustrated to be separated from the other electronic device 200 in FIG. 5, the data storage device 225 may be included in the other electronic device 200 according to an implementation form of the present invention.

Link configuration information necessary to establish a second communication link with the other electronic device 200 may have also been stored in the data storage device 225. For example, information about a communication module included in the other electronic device 200 may have been stored in the data storage device 225.

In this case, the controller 180 of the mobile terminal 100 may establish the second communication link with the other electronic device 200 on the basis of the information about the communication module of the other electronic device 200, which is received from the data storage device 225 through the first communication link already established.

The second communication unit 110B may establish a plurality of the second communication links with the other electronic device 200 under the control of the controller 180. For example, the second communication unit 110B may establish a plurality of communication links, such as a Bluetooth communication link, a Wi-Fi communication link, and a Zigbee communication link, with the other electronic device 200 under the control of the controller 180. As shown in FIG. 5, the second communication unit 110B may include the plurality of second communication modules 110B1 and 110B2.

At least one of the plurality of second communication links may have a wider communication range than the first communication link. For example, if the first communication link is an NFC link and at least one of the plurality of second communication links is a Bluetooth communication link, the mobile terminal 100 may perform data communication with the other electronic device 200 through the Bluetooth communication link even the outside of an NFC range.

It is also preferred that at least one of the plurality of second communication links have a broader bandwidth than the first communication link. For example, if the first communication link is an NFC link and at least one of the plurality of second communication links is a Wi-Fi communication link, the mobile terminal 100 may perform data communication with the other electronic device 200 at a higher speed than that of the NFC link through the Wi-Fi communication link.

The controller 180 may establish one of the plurality of second communication links on the basis of first link configuration information which is received from the data storage device 225 through the first communication link and then sequentially establish the remaining second communication links according to the predetermined order of priority.

In the process of establishing the remaining second communication links after establishing the one second communication link, the controller 180 may share second link configuration information used to establish the remaining second communication links through one of the generated second communication links. In this case, the controller 180 may establish the remaining second communication links with the other electronic device 200 on the basis of the shared second link configuration information.

For example, if the first second communication link of a plurality of second communication links has been established on the basis of first link information through a first communication link with the data storage device 225, the controller 180 may share second link configuration information, used to establish a second second communication link, with the other electronic device 200 through the first second communication link. If the second second communication link is established, the controller 180 may share second link configuration information, used to establish a third second communication link, with the other electronic device 200 through the first second communication link or the second second communication link.

Accordingly, a user of the mobile terminal 100 according to the present invention may establish a plurality of communication links between the mobile terminal 100 and the other electronic device 200 at the same time by performing only an operation (e.g., an NFC tagging operation) for establishing a first communication link with the data storage device 225. That is, a user of the mobile terminal 100 according to the present invention may establish a plurality of second communication links between the mobile terminal 100 and the other electronic device 200 even without inputting information necessary to establish the plurality of second communication links.

Figure 6:
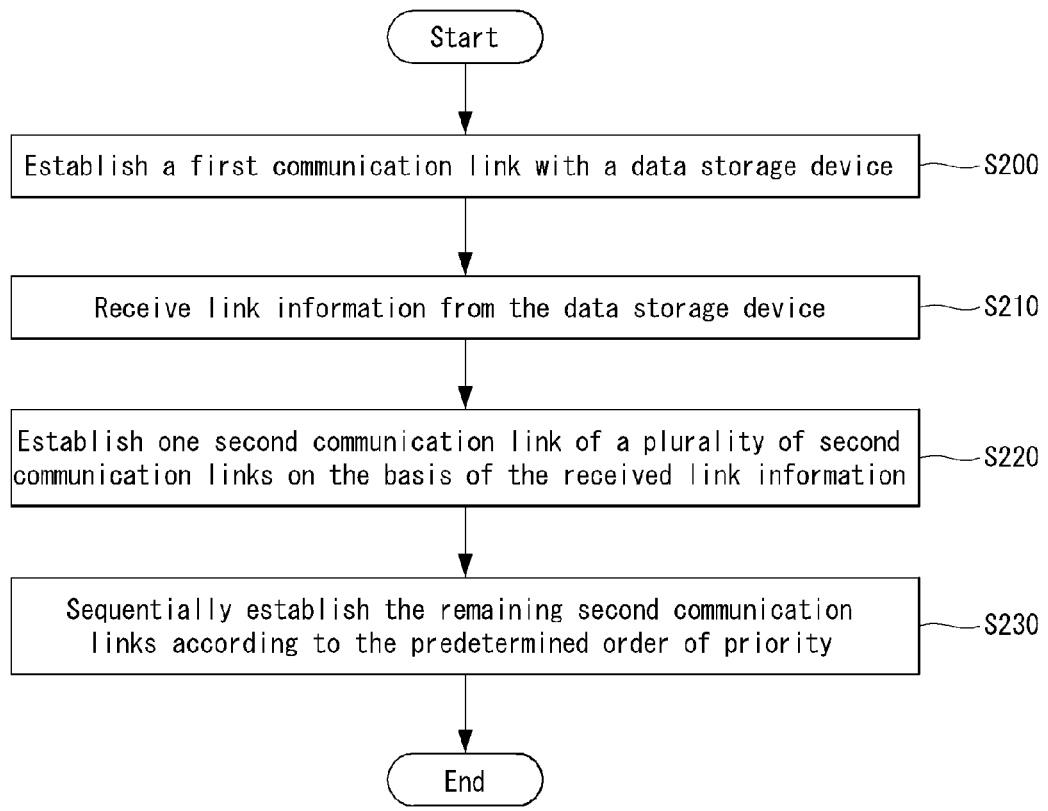
FIG. 6 is a flowchart illustrating an example of a method of the mobile terminal according to the embodiment of the present invention establishing communication links with other electronic devices.

FIG. 6 is a flowchart illustrating an example of a method of the mobile terminal 100 according to the embodiment of the present invention establishing communication links with the other electronic device 200. The method of establishing communication links is described below with reference to relevant drawings.

The controller 180 of the mobile terminal 100 establishes a first communication link with the data storage device 225 at step S200. Next, the controller 180 receives link information from the data storage device 225 through the first communication link at step S210. The link information may include information about one of a plurality of communication modules included in the other electronic device 200.

When the link information is received, the controller 180 establishes one second communication link of a plurality of second communication links on the basis of the received link information at step S220. Meanwhile, when the link information is received, the controller 180 may activate a plurality of communication modules included in the mobile terminal 100 as a preparation step for establishing the plurality of second communication links.

When the one second communication link is established, the controller 180 sequentially establishes the remaining second communication links according to the predetermined order of priority other than the one second communication link at step S230. The order of priority for the remaining second communication links may be previously determined by a user or may be previously determined by the controller 180 on the basis of at least one of the communication bandwidth, the communication distance, and the power consumption of each of the plurality of second communication links.

Figure 7:
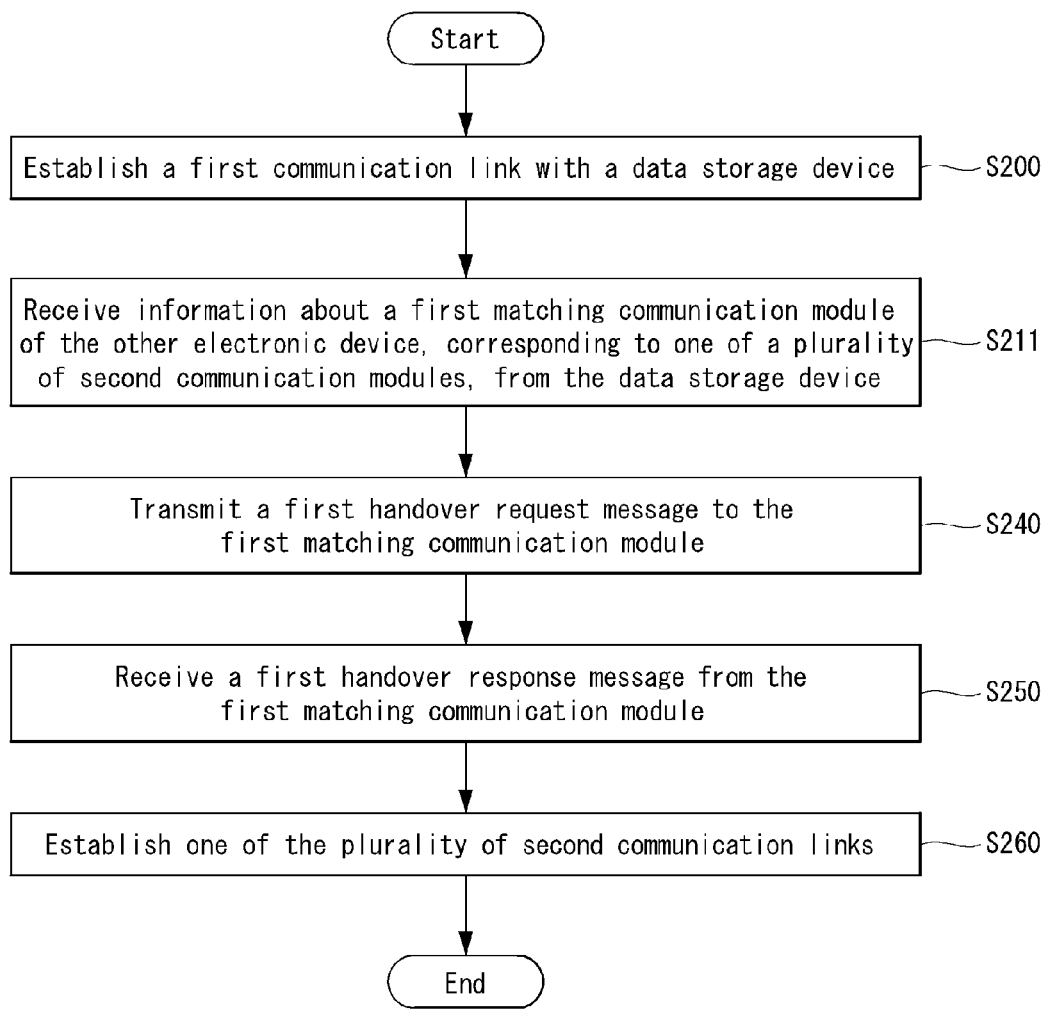
FIG. 7 shows an example of a process in which communication links with other electronic devices are established on the basis of link configuration information received from a data storage device according to the method of the mobile terminal according to the embodiment of the present invention establishing communication links shown in FIG. 6.

FIG. 7 shows an example of a process in which communication links with the other electronic device 200 are established on the basis of link configuration information received from the data storage device 225 according to the method of the mobile terminal 100 according to the embodiment of the present invention establishing communication links shown in FIG. 6. A process of establishing the communication links is described below with reference to relevant drawings.

First, the controller 180 of the mobile terminal 100 controls the first communication module 110A so that the first communication module 110A establishes a first communication link with the data storage device 225 at step S200. When the first communication link is established, the controller 180 receives information about the first matching communication module 251 of the other electronic device 200, corresponding to one of the plurality of second communication modules 110B, from the data storage device 225 through the first communication link at step S211.

When the information about the first matching communication module 251 is received, the controller 180 controls the one second communication module so that the one second communication module transmits a first handover request message to the first matching communication module 251 on the basis of the information about the first matching communication module 251 at step S240. Next, the mobile terminal 100 receives a first handover response message for the first handover request message from the first matching communication module 251 at step S250.

When the first handover response message is received, the controller 180 controls the one second communication module so that the one second communication module establishes one second communication link with the first matching communication module 251, from among the plurality of second communication links at step S260.

A detailed example of the communication link establishment process according to FIG. 7 is described below, on the assumption that the data storage device 225 is an NFC tag, the first communication module 110A is an NFC module, and the first matching communication module 251 is a Bluetooth communication module.

When a user performs a tagging operation for the NFC tag 225 by using the mobile terminal 100, the controller 180 establishes an NFC link with the NFC tag 225 at step S200 and receives information about the Bluetooth communication module 251, included in the other electronic device 200, from the NFC tag 225 through the NFC link at step S211.

Next, the controller 180 transmits a first handover request message (i.e., a request message for establishing a Bluetooth communication link) to the Bluetooth communication module 251 in the basis of information about the Bluetooth communication module 251 at step S240. Next, the controller 180 receives a first handover response message (i.e., a response message for establishing the Bluetooth communication link) from the Bluetooth communication module 251 at step S250 and establishes the Bluetooth communication link with the other electronic device 200 on the basis of the first handover response message.

Figure 8:
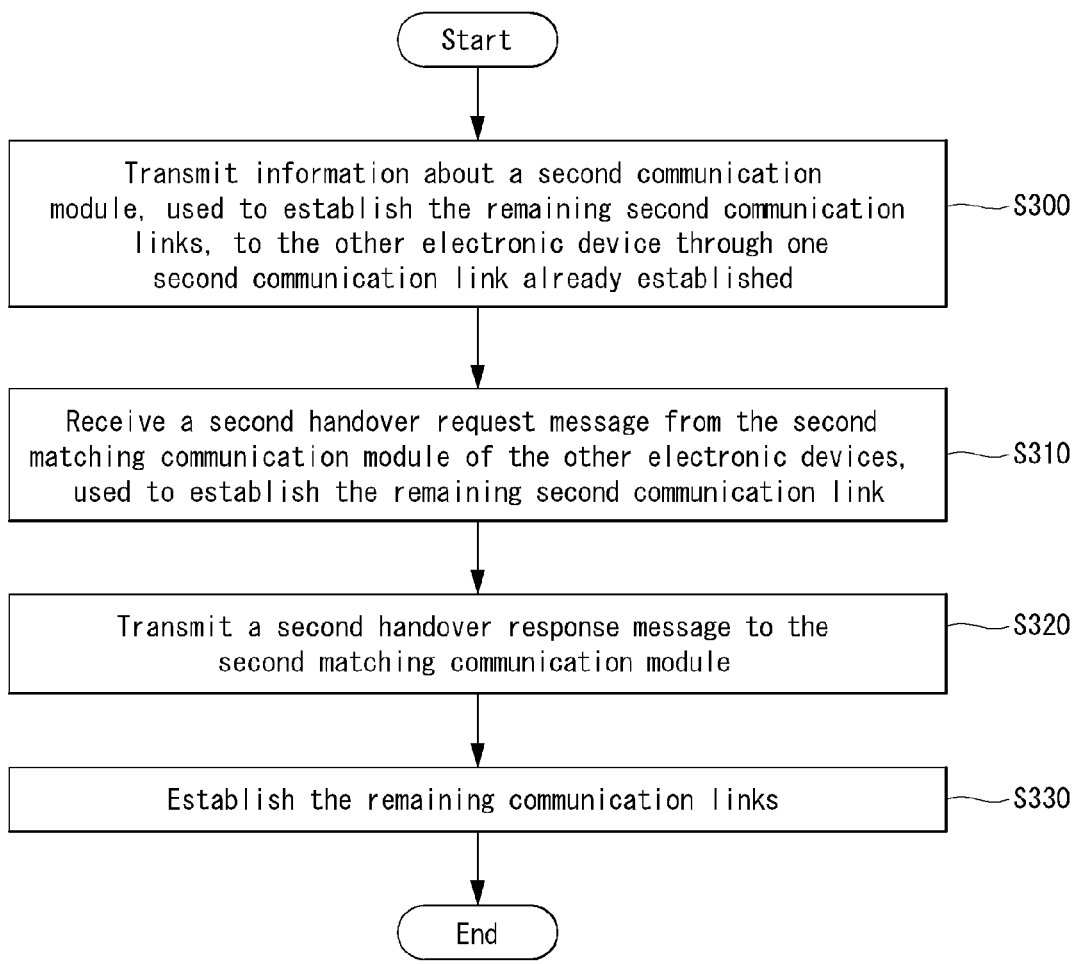
FIG. 8 shows an example of the process in which a plurality of communication links with other electronic devices is established according to the method of the mobile terminal according to the embodiment of the present invention establishing communication links shown in FIG. 6.
Figure 9:
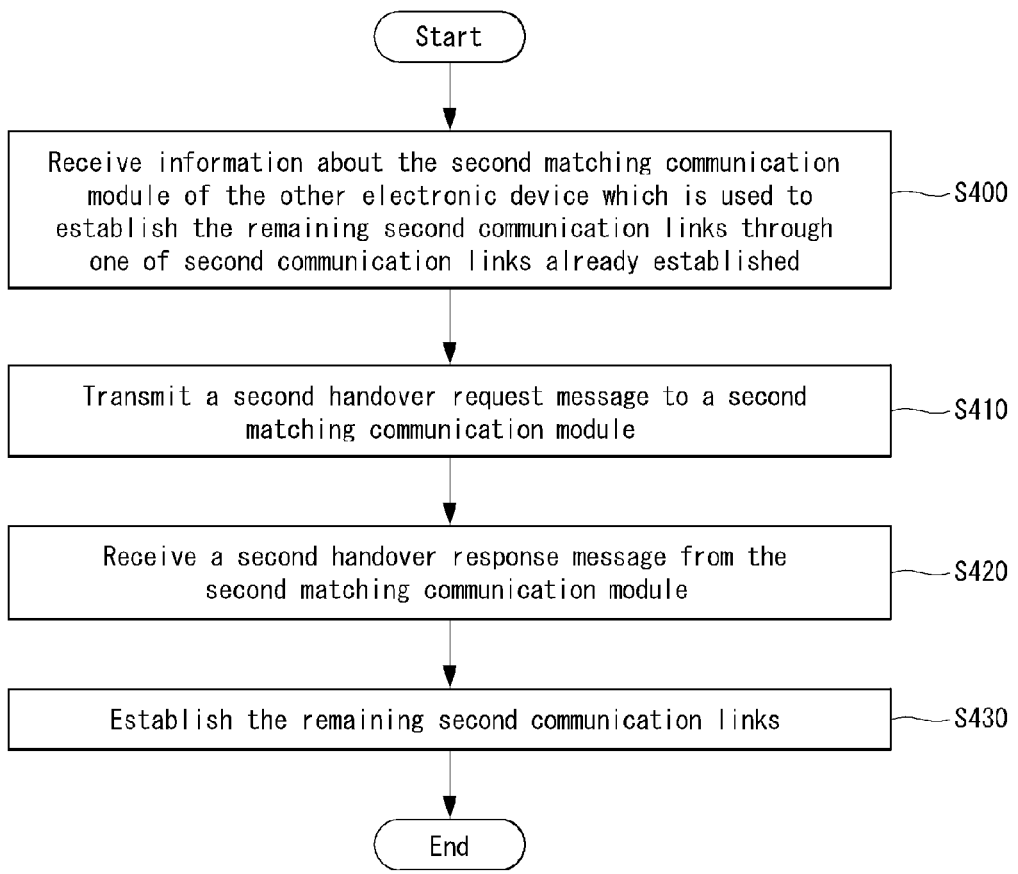
FIG. 9 shows another example of the process in which a plurality of communication links with other electronic devices is established according to the method of the mobile terminal according to the embodiment of the present invention establishing communication links shown in FIG. 6.

FIG. 8 shows another example of the process in which a plurality of communication links with the other electronic device 200 is established according to the method of the mobile terminal 100 according to the embodiment of the present invention establishing communication links shown in FIG. 6. For reference, FIGS. 8 and 9 show examples of a process in which, after at least one of a plurality of second communication links that may be established between the mobile terminal 100 and the other electronic device 200 was established, the remaining second communication links are established. The process of establishing the plurality of communication links is described below with reference to relevant drawings.

First, the controller 180 of the mobile terminal 100 transmits information about a second communication module, used to establish the remaining second communication links, to the other electronic device 200 through the one second communication link already established at step S300. Next, the mobile terminal 100 receives a second handover request message from the second matching communication module 252 of the other electronic devices 100, which corresponds to the second communication module used to establish the remaining second communication links at step S310.

The controller 180 analyzes the second handover request message and controls the second communication module used to establish the remaining second communication links so that the second communication module transmits a second handover response message to the second matching communication module 252 at step S320. Accordingly, the remaining second communication links are established at step S330.

A detailed example of the communication link establishment process shown in FIG. 8 is described, on the assumed that a second communication link already established is a Bluetooth communication link and a Zigbee communication link, the remaining second communication links are Wi-Fi communication links, and the second matching communication module 252B of the other electronic device 200 is a Wi-Fi communication module. First, the controller 180 transmits information about the Wi-Fi communication module of the mobile terminal 100, used to establish a Wi-Fi communication link, to the Wi-Fi communication module 252 of the other electronic device 200 through at least one of the Bluetooth communication link and the Zigbee communication links which have already been established at step S300. The second communication link over which the information about the Wi-Fi communication module will be transmitted may be previously determined by a user choice or may be determined according to the predetermined order of priority.

The Wi-Fi communication module 252 of the other electronic device 200 that has received the information about the Wi-Fi communication module of the mobile terminal 100 transmits a second handover request message (i.e., a request message for establishing the Wi-Fi communication link) to the Wi-Fi communication module of the mobile terminal 100, and the mobile terminal 100 receives the request message at step S310.

Next, the controller 180 transmits a response message for the request message for establishing the Wi-Fi communication link to the Wi-Fi communication module 252 of the other electronic device 200 at step S320. Accordingly, the Wi-Fi communication link with the other electronic device 200 is established at step S330.

FIG. 9 shows yet another example of the process in which a plurality of communication links with the other electronic device 200 is established according to the method of the mobile terminal 100 according to the embodiment of the present invention establishing communication links shown in FIG. 6. A process of establishing the plurality of communication links is described below with reference to relevant drawings.

First, the controller 180 of the mobile terminal 100 receives information about the second matching communication module 252 of the other electronic device 200, used to establish the remaining second communication links, from the other electronic device 200 through at least one of second communication links already established at step S400. Next, the controller 180 transmits a second handover request message to the second matching communication module 252 at step S410.

Next, the controller 180 receives a second handover response message for the second handover request message from the second matching communication module 252 at step S420 and then establishes the remaining second communication links with the other electronic device 200 on the basis of the second handover response message at step S430.

A detailed example of the communication link establishment process shown in FIG. 9 is described below, on the assumption that a second communication link already established is a Bluetooth communication link and a Zigbee communication link, the remaining second communication links are Wi-Fi communication links, and the second matching communication module 252B of the other electronic device 200 is a Wi-Fi communication module.

First, the controller 180 receives information about the Wi-Fi communication module 252 of the other electronic device 200 through at least one of the Bluetooth communication link and the Zigbee communication link with the other electronic device 200 which have already been established at step S400. The second communication link over which the information about the Wi-Fi communication module 252 will be transmitted may be determined by a user choice or may be determined according to the predetermined order of priority.

When the information about the Wi-Fi communication module 252 of the other electronic device 200 is received, the controller 180 transmits a request message for establishing a Wi-Fi communication link to the Wi-Fi communication module 252 at step S410. Next, the mobile terminal 100 receives a response message for the request message from the Wi-Fi communication module 252 at step S420 and establishes the Wi-Fi communication link with the other electronic device 200 on the basis of the message.

Figure 10:
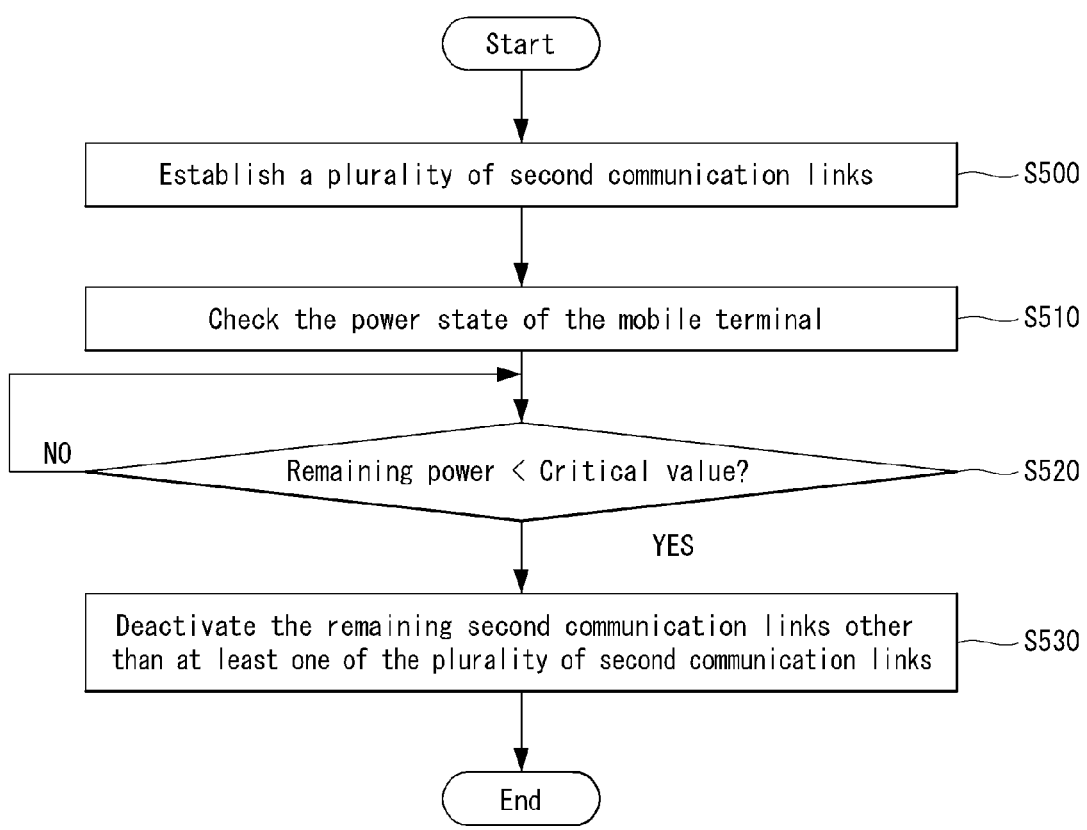
FIG. 10 is a flowchart illustrating a method of the mobile terminal according to the embodiment of the present invention managing a plurality of communication links established between the mobile terminal and other electronic devices.

FIG. 10 is a flowchart illustrating a method of the mobile terminal 100 according to the embodiment of the present invention managing a plurality of communication links established between the mobile terminal 100 and the other electronic device 200. The method of managing the plurality of communication links is described below with reference to relevant drawings.

The controller 180 of the mobile terminal 100 controls the plurality of second communication modules 110B included in the mobile terminal 100 so that the plurality of second communication modules establishes a plurality of second communication links with the other electronic device 200 at step S500. When the plurality of second communication links is established, the controller 180 checks the power state of the mobile terminal 100 at step S510.

Next, the controller 180 determines whether the remaining power of the mobile terminal 100 is smaller than a predetermined critical value at step S520. If, as a result of the determination, the remaining power of the mobile terminal 100 is smaller than the critical value, the controller 180 may deactivate the remaining second communication links other than at least one of the plurality of second communication links at step S530. Here, the at least one second communication link may have lower power consumption than the remaining second communication links.

That is, if the remaining power of the power supply unit 190 is smaller than a specific level, the mobile terminal 100 may perform data communication with other electronic device 200 by using a communication link having low power consumption, from among communication links with the other electronic device 200 in order to extend the utilization time of the mobile terminal 100.

Figure 11:
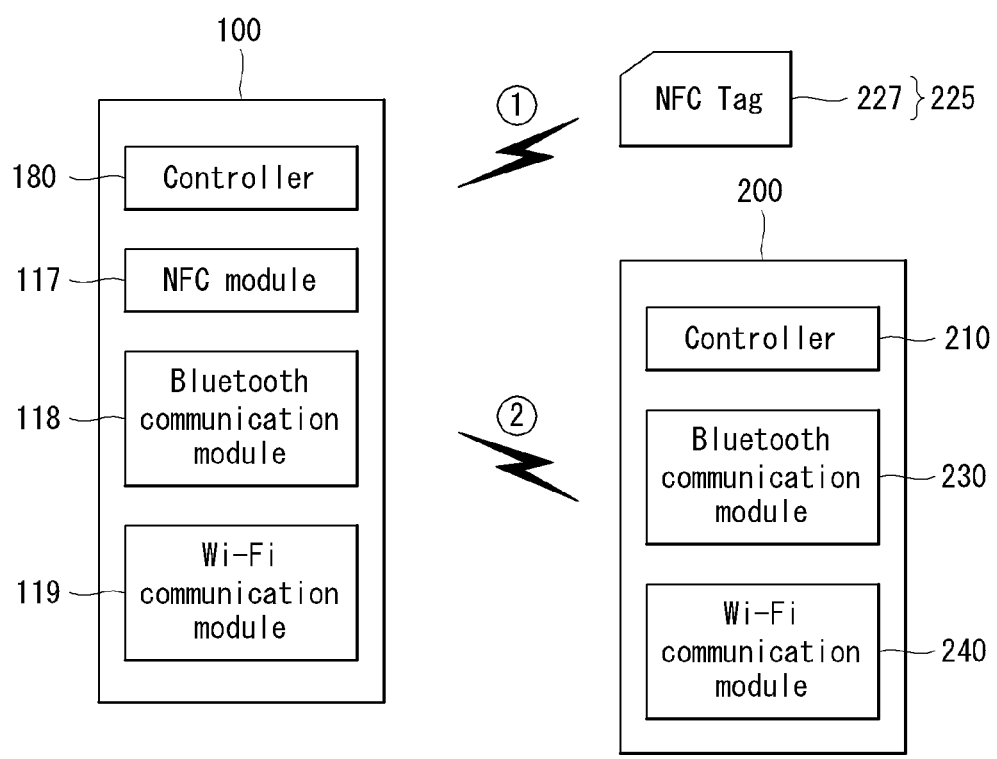
FIG. 11 shows yet another example where the mobile terminal according to the embodiment of the present invention establishes communication links with other electronic devices.

FIG. 11 shows yet another example where the mobile terminal 100 according to the embodiment of the present invention establishes communication links with the other electronic device 200.

Referring to FIG. 11, the mobile terminal 100 includes an NFC module 117, a Bluetooth communication module 118, a Wi-Fi communication module 119, and a controller 180. For reference, only elements necessary to describe a characteristic that the mobile terminal 100 establishes the communication links is simply shown in FIG. 11.

Furthermore, referring to FIG. 11, the other electronic device 200 includes a controller 210, a Bluetooth communication module 230, and a Wi-Fi communication module 240. The controller 210 may control the overall operation of the other electronic device 200. The Bluetooth communication module 230 corresponds to the Bluetooth communication module 118 of the mobile terminal 100, and the Wi-Fi communication module 240 corresponds to the Wi-Fi communication module 119 of the mobile terminal 110.

The NFC module 117 may establish an NFC link with an NFC tag 227 (i.e., a kind of the data storage device 225) under the control of the controller 180. Although the NFC tag 227 is illustrated to be separated from the other electronic device 200 in FIG. 11, the NFC tag 227 may be included in the other electronic device 200 according to an implementation form of the present invention.

The Bluetooth communication module 118 may establish a Bluetooth communication link with the other electronic device 200 under the control of the controller 180. The Wi-Fi communication module 119 may establish a Wi-Fi communication link with the other electronic device 200 under the control of the controller 180.

The controller 180 may control the Bluetooth communication module 118 so that the Bluetooth communication module 118 establishes the Bluetooth communication link by using first link configuration information received from the NFC tag 227 through the NFC link. Next, the controller 180 may share second link configuration information for establishing the Wi-Fi communication link through the Bluetooth communication link with the other electronic device 200.

Figure 12:
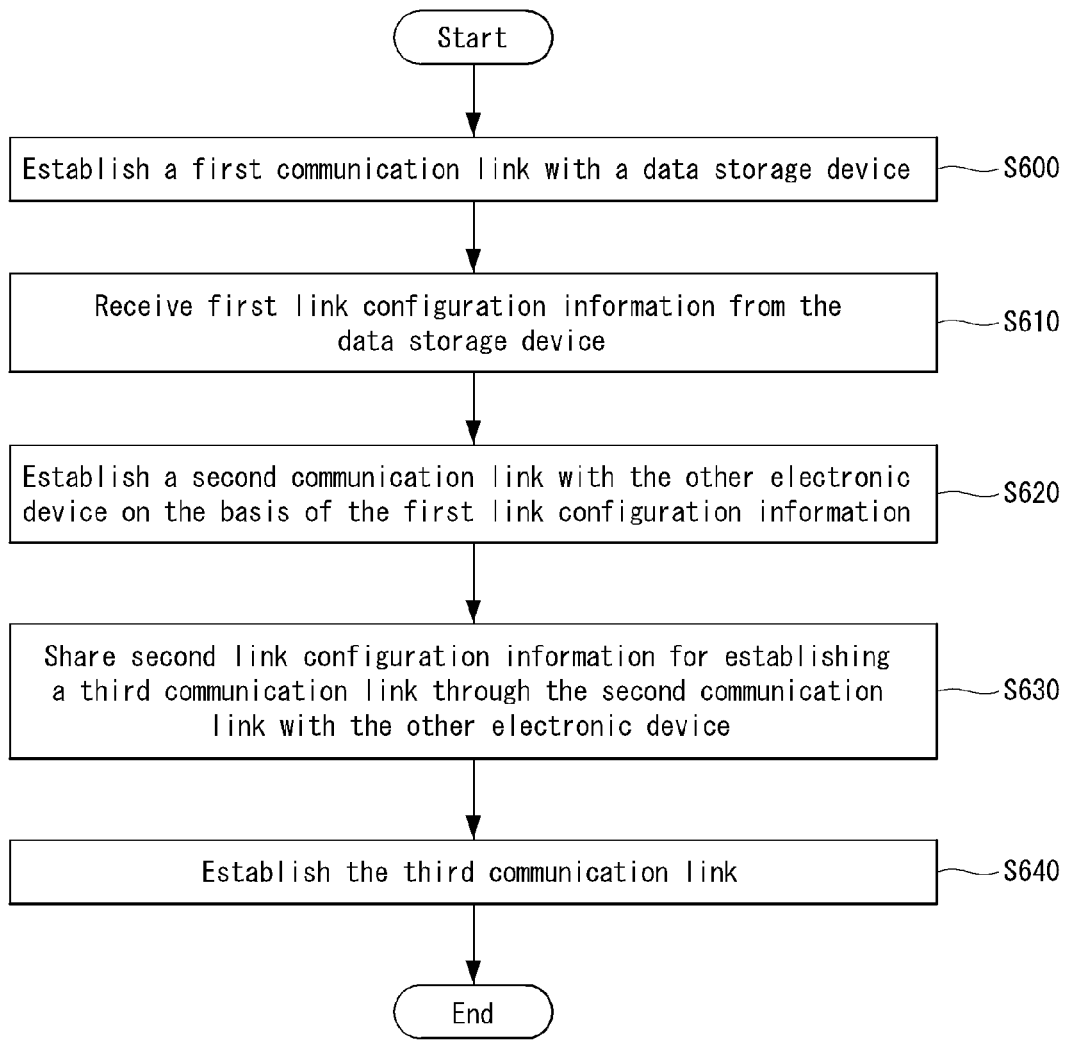
FIG. 12 is a flowchart illustrating another example of a method of the mobile terminal according to the embodiment of the present invention establishing communication links with other electronic devices.

FIG. 12 is a flowchart illustrating another example of a method of the mobile terminal 100 according to the embodiment of the present invention establishing communication links with the other electronic device 200. The method of establishing a communication link is described below with reference to FIGS. 11 and 12.

First, the controller 180 of the mobile terminal 100 controls a first communication module so that the first communication module establishes a first communication link with the data storage device at step S600. When the first communication link is established, the controller 180 receives first link configuration information used to establish a second communication link through the first communication link at step S610.

Referring to FIG. 11, if the distance to the NFC tag 225 is determined to be shorter than a predetermined distance, the controller 180 controls the NFC module 117 so that the NFC module 117 establishes an NFC link with the NFC tag 225 at step S600. The controller 180 receives the first link configuration information used to establish a Bluetooth communication link with the other electronic device 200 (i.e., information about the Bluetooth communication module 230 included in the other electronic device 200) through the NFC link at step S610.

When the first link configuration information is received, the controller 180 controls a second communication module so that the second communication module establishes a second communication link with the other electronic device 200 on the basis of the first link configuration information at step S620. Referring to FIG. 11, the controller 180 controls the Bluetooth communication module 118 so that the Bluetooth communication module 118 establishes a Bluetooth communication link with the Bluetooth communication module 230 of the other electronic device 200 on the basis of the received information about the Bluetooth communication link of the other electronic device 200 at step S620.

When the second communication link is established, the controller 180 shares second link configuration information for establishing a third communication link with the other electronic device 200 through the second communication link at step S630 and then establishes the third communication link with the other electronic device 200 at step S640. Here, at least one of the second communication link and the third communication link may have a longer communication distance than the first communication link or may have a wider bandwidth than the first communication link.

Referring to FIG. 11, when the Bluetooth communication link with the other electronic device 200 is established, the controller 180 may share link configuration information for establishing a Wi-Fi communication link with the other electronic device 200 through the Bluetooth communication link at step S630 and establish the Wi-Fi communication link on the basis of the shared link configuration information at step S640. Here, each of the Bluetooth communication link and the Wi-Fi communication link has a longer communication distance than an NFC link and has a wider bandwidth than the NFC link.

Figure 13:
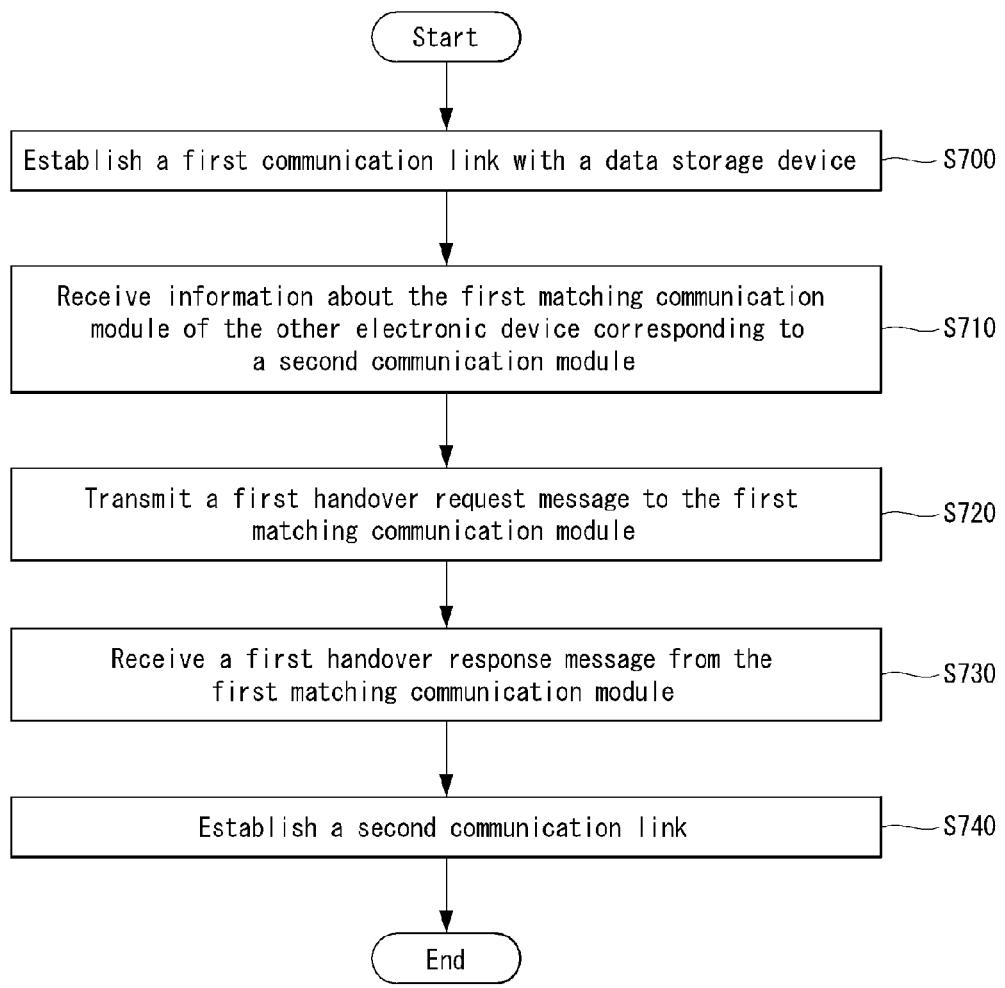
FIG. 13 shows an example of a process in which communication links with other electronic devices are established on the basis of link configuration information received from the data storage device according to the method of the mobile terminal according to the embodiment of the present invention establishing communication links shown in FIG. 12.

FIG. 13 shows an example of a process in which communication links with the other electronic device 200 are established on the basis of link configuration information received from the data storage device according to the method of the mobile terminal 100 according to the embodiment of the present invention establishing communication links shown in FIG. 12. The process of establishing the communication links with the other electronic device 200 is described below with reference to FIGS. 11 to 13.

First, the controller 180 of the mobile terminal 100 establishes a first communication link with the data storage device 225 at step S700. Next, the mobile terminal 100 receives information about the first matching communication module of the other electronic device 200, corresponding to a second communication module, from the data storage device 225 through the first communication link at step S710. When the information about the first matching communication module is received, the controller 180 transmits a first handover request message to the first matching communication module at step S720.

Referring to FIG. 11, the controller 180 establishes an NFC link with the NFC tag 225 at step S700, receives information about the Bluetooth communication module 230 of the other electronic device 200 corresponding to the Bluetooth communication module 118 of the mobile terminal 100 through the NFC link at step S710, and transmits a request message for establishing a Bluetooth communication link to the Bluetooth communication module 230 on the basis of the received information about the Bluetooth communication module 230 at step S720.

Next, the controller 180 receives a first handover response message for the first handover request message from the first matching communication module at step S730 and then establishes a second communication link with the other electronic device 200 on the basis of the first handover response message at step S740. Referring to FIG. 11, the controller 180 receives a response message for the request message for establishing the Bluetooth communication link from the Bluetooth communication module 230 at step S730 and establishes the Bluetooth communication link with the other electronic device 200 on the basis of the received response message at step S740.

Figure 14:
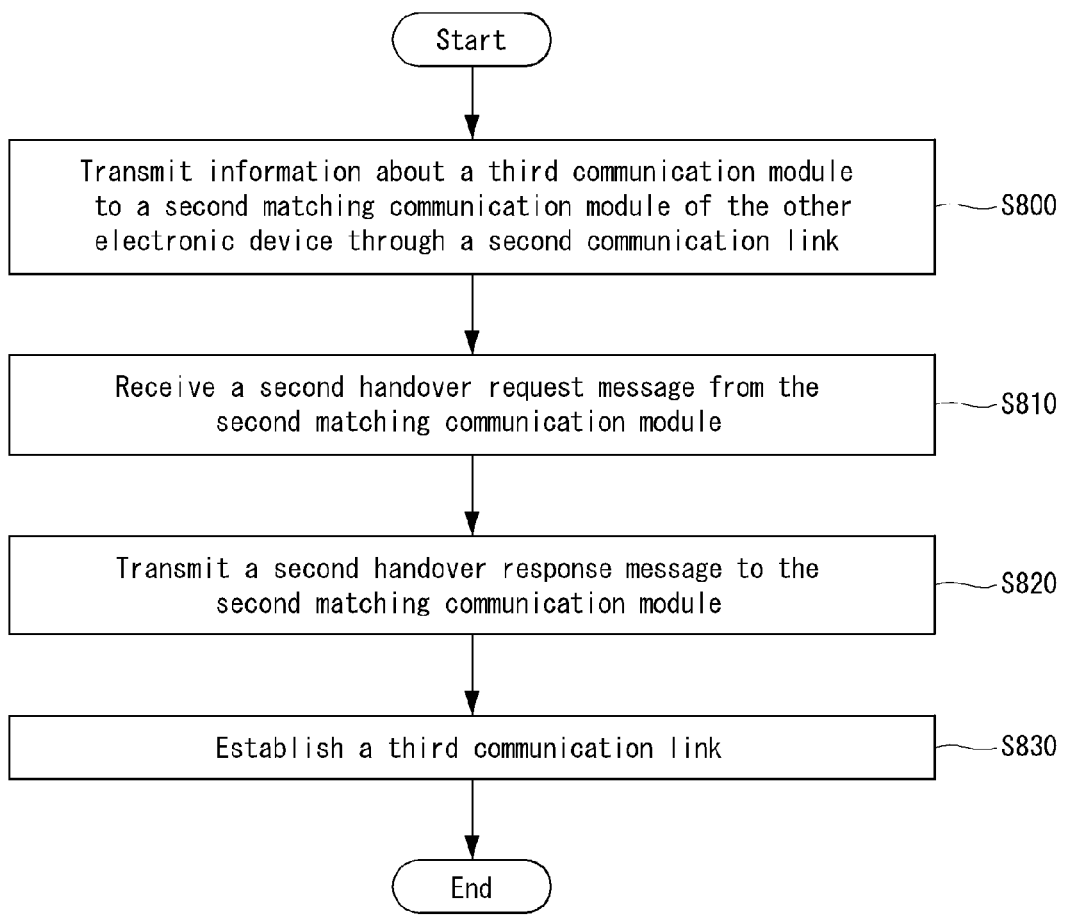
FIG. 14 shows another example of the process in which a plurality of communication links with other electronic devices is established according to the method of the mobile terminal according to the embodiment of the present invention establishing communication links shown in FIG. 12.

FIG. 14 shows an example of the process in which a plurality of communication links with the other electronic device 200 is established according to the method of the mobile terminal 100 according to the embodiment of the present invention establishing communication links shown in FIG. 12. The process of establishing the plurality of communication links is described below with reference to relevant drawings.

When a second communication link with the other electronic device 200 is established, the controller 180 shares information about the third communication module of the mobile terminal 100 with the other electronic device 200 through the second communication link at step S800. Referring to FIG. 14, when a Bluetooth communication link with the other electronic device 200 is established, the controller 180 shares information about the Wi-Fi communication module 119 of the mobile terminal 100 with the other electronic device 200 through the Bluetooth communication link at step S800.

Next, the mobile terminal 100 receives a second handover request message from the second matching communication module at step S810. The controller 180 transmits a second handover response message for the second handover request message to the second matching communication module at step S820. Accordingly, a third communication link with the other electronic device 200 is established at step S830. Referring to FIG. 11, the controller 180 receives a second handover request message from the Wi-Fi communication module 240 of the other electronic device 200 at step S810 and transmits a response message for the second handover request message to the Wi-Fi communication module 240 at step S820, so that a Wi-Fi communication link with the other electronic device 200 is established at step S830.

Figure 15:
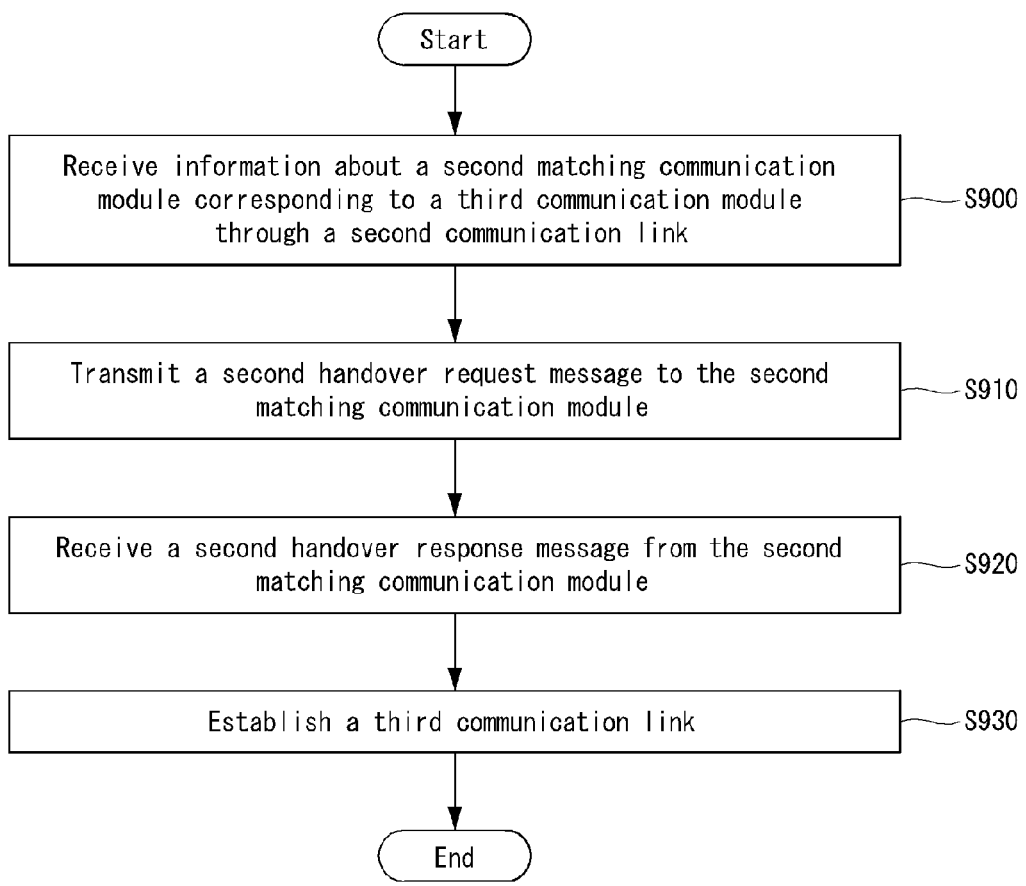
FIG. 15 shows yet another example of the process in which a plurality of communication links with other electronic devices is established according to the method of the mobile terminal according to the embodiment of the present invention establishing communication links shown in FIG. 12.

FIG. 15 shows yet another example of the process in which the plurality of communication links with the other electronic device 200 is established according to the method of the mobile terminal 100 according to the embodiment of the present invention establishing communication links shown in FIG. 12. The process of establishing the plurality of communication links is described below with reference to relevant drawings.

The mobile terminal 100 receives information about the second matching communication module of the other electronic device 200, corresponding to the third communication module of the mobile terminal 100, through the second communication link at step S900. The controller 180 transmits a second handover request message to the second matching communication module on the basis of the information about the second matching communication module at step S910.

Referring to FIG. 11, the mobile terminal 100 receives information about the Wi-Fi communication module 240 of the other electronic device 200 through the Bluetooth communication link with the other electronic device 200 at step S900 and transmits a request message for establishing a Wi-Fi communication link to the Wi-Fi communication module 240 on the basis of the information about the received Wi-Fi communication module 240 at step S910.

When the second handover response message for the second handover request message is received from the second matching communication module at step S920, a third communication link between the mobile terminal 100 and the other electronic device 200 is established on the basis of the received second handover response message at step S930. Referring to FIG. 11, when a response message for the request message for establishing the Wi-Fi communication link is received from the Wi-Fi communication module 240 of the other electronic device 200 at step S920, the Wi-Fi communication link between the mobile terminal 100 and the other electronic device 200 is established at step S930.

Figure 16:
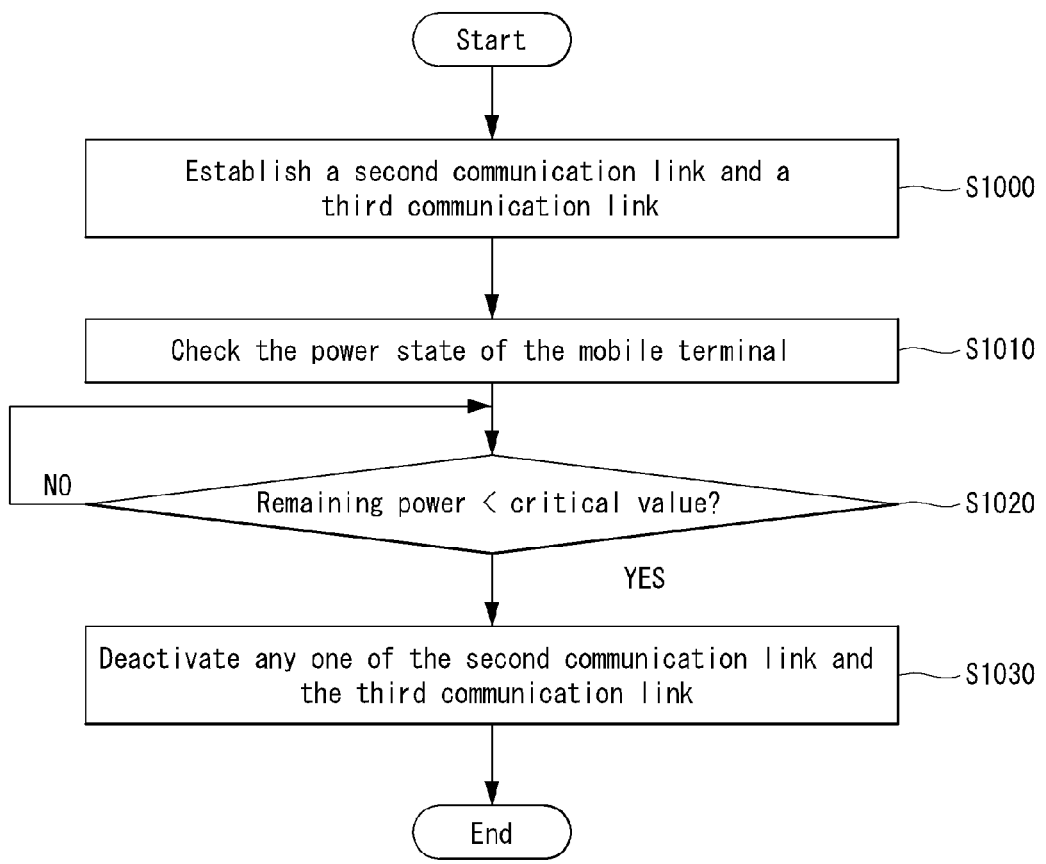
FIG. 16 is a flowchart illustrating a method of the mobile terminal according to the embodiment of the present invention managing a plurality of communication links established between the mobile terminal and other electronic devices.

FIG. 16 is a flowchart illustrating a method of the mobile terminal 100 according to the embodiment of the present invention managing a plurality of communication links established between the mobile terminal 100 and the other electronic device 200. The method of managing the plurality of communication links is described below with reference to relevant drawings.

The controller 180 of the mobile terminal 100 controls communication modules included in the mobile terminal 100 so that the communication modules establish a second communication link with and a third communication link with the other electronic device 200 at step S1000. When the second communication link and the third communication link are established, the controller 180 checks the power state of the mobile terminal 100 at step S1010.

Next, the controller 180 determines whether the remaining power of the mobile terminal 100 is smaller than a predetermined critical value at step S1020. If, as a result of the determination, the remaining power of the mobile terminal 100 is smaller than the critical value, the controller 180 may deactivated any one of the second communication link and the third communication link. Here, the deactivated communication link may have greater power consumption than the other communication link.

For example, if the remaining power of the mobile terminal 100 is determined to be smaller than a specific level in the state where a Bluetooth communication link and a Wi-Fi communication link have been established between the mobile terminal 100 and the other electronic device 200, the controller 180 may deactivated the Wi-Fi communication link having relatively greater power consumption and perform data communication with the other electronic device 200 through the Bluetooth communication link.

Figure 17:
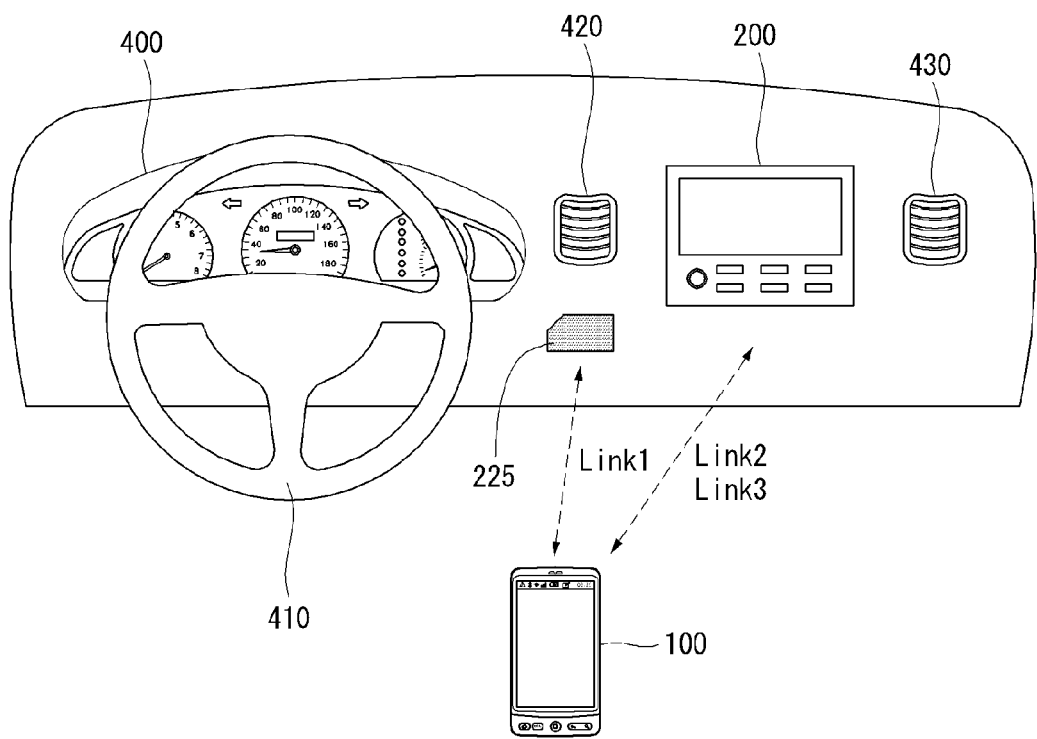
FIG. 17 is a diagram showing another example of a system environment including the mobile terminal according to the embodiment of the present invention.

FIG. 17 is a diagram showing another example of a system environment including the mobile terminal 100 according to the embodiment of the present invention. From FIG. 17, it can be seen that the system includes the mobile terminal 100 according to the present invention and the data storage device 225 and a head unit 200 which are mounted on a vehicle. It can also be seen that a dashboard 400, a steering wheel 410, and an air conditioning apparatus 410 mounted on the vehicle are included. The head unit 200 may indicate or control the state of various devices included in the vehicle.

According to the system of FIG. 17, when a first communication link Link 1 with the data storage device 225 is established, the mobile terminal 100 may automatically establish a second communication link and a third communication links Link 2 and Link 3 with the head unit 200. Accordingly, a user may take only measures for establishing the first communication link Link 1 through the mobile terminal 100 and then control the head unit 200 through the second communication link Link 2 or the third communication link Link 3.

According to the system of FIG. 17, the data storage device 225 may be formed of an NFC tag, the first communication link Link 1 may be an NFC link, and the second communication link Link 2 and the third communication link Link 3 may be a Bluetooth communication link and a Wi-Fi communication link. In this case, a user may establish the Bluetooth communication link and the Wi-Fi communication link between the mobile terminal 100 and the head unit 200 by performing only a tagging operation for the NFC tag through the mobile terminal 100 and perform data communication with the head unit 200 by using the established communication links.

Figure 18:
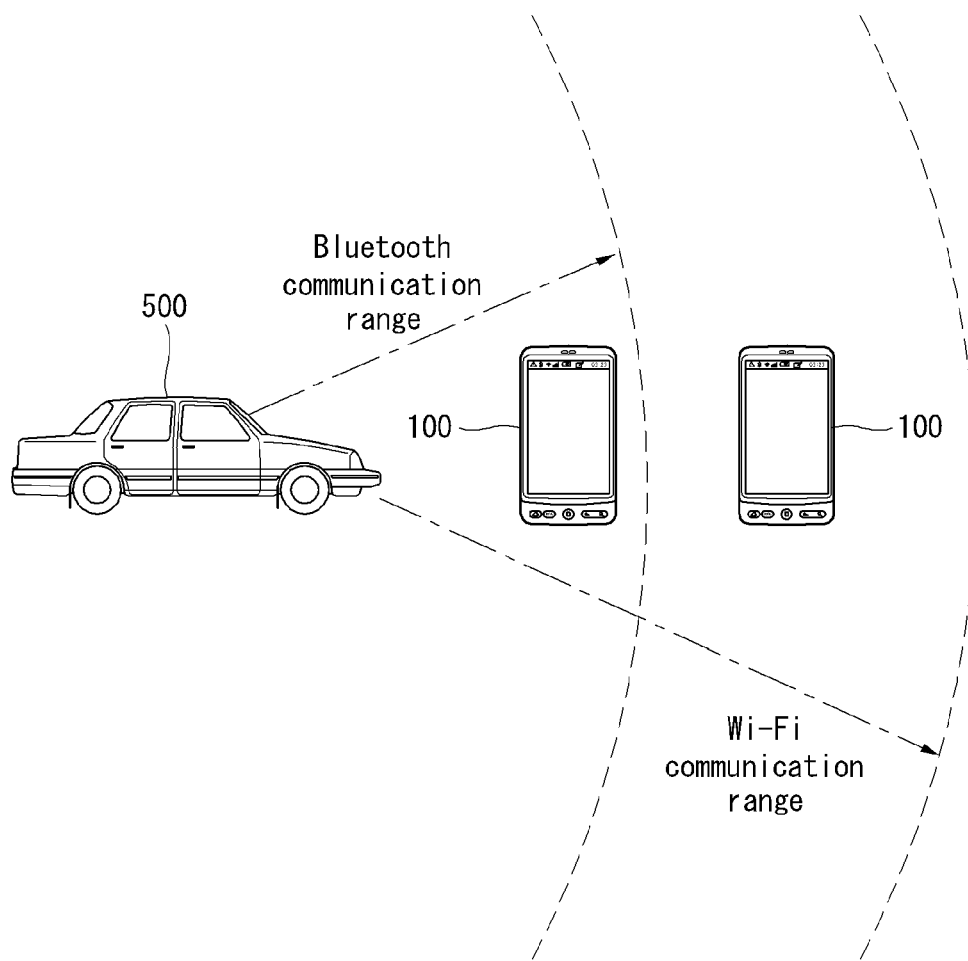
FIG. 18 a diagram illustrating the operating state of the mobile terminal according to the present invention in the system environment of FIG. 17.

FIG. 18 is a diagram illustrating the operating state of the mobile terminal 100 according to the present invention in the system environment shown in FIG. 17. From FIG. 18, it can be seen that, if communication modules included in the head unit 200 of the vehicle are a Bluetooth communication module and a Wi-Fi communication module, a user of the mobile terminal 100 may control the head unit 200 within a Bluetooth communication range or a Wi-Fi communication range outside the vehicle.

Figure 19:
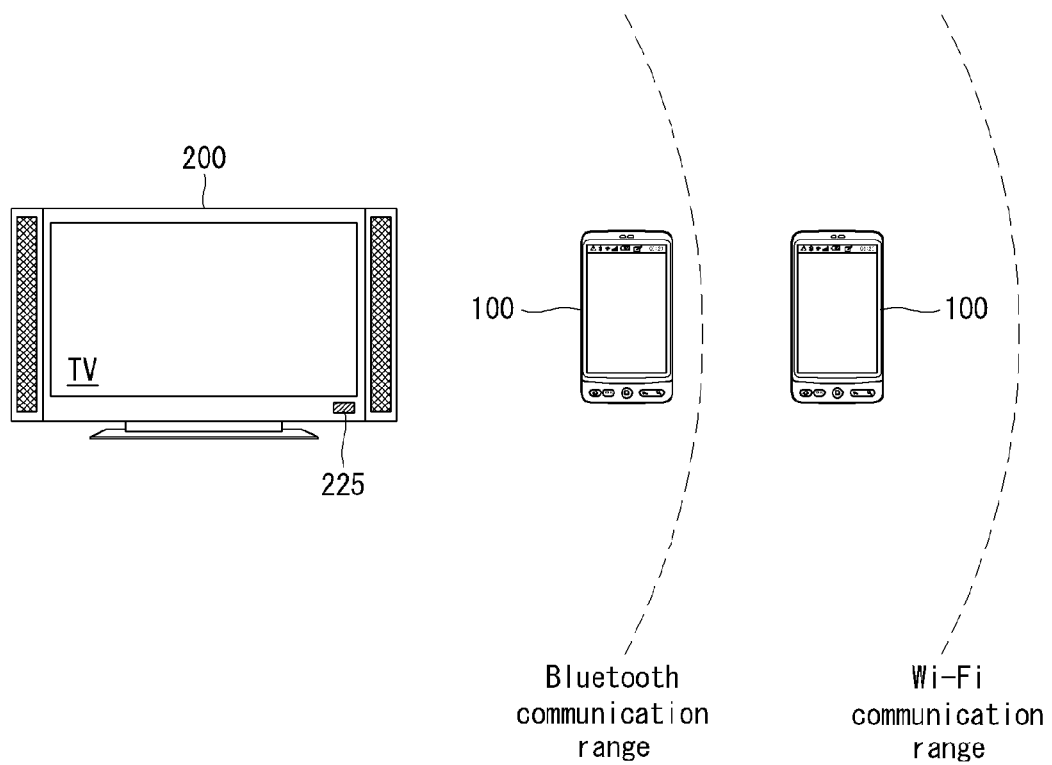
FIG. 19 is a diagram showing yet another example of a system environment including the mobile terminal according to the embodiment of the present invention.

FIG. 19 is a diagram showing yet another example of a system environment including the mobile terminal 100 according to the embodiment of the present invention. From FIG. 19, it can be seen that, if the other electronic device 200 establishing a communication link with the mobile terminal 100 is TV and communication modules included in the TV are a Bluetooth communication module and a Wi-Fi communication module, a user of the mobile terminal 100 control the TV within a Bluetooth communication range or a Wi-Fi communication range.

The above-described method of forming communication link in the mobile terminal may be written as computer programs and may be implemented in digital microprocessors that execute the programs using a computer readable recording medium. The method of controlling the mobile terminal may be executed through software. The software may include code segments that perform required tasks. Programs or code segments may also be stored in a processor readable medium or may be transmitted according to a computer data signal combined with a carrier through a transmission medium or communication network.

The computer readable recording medium may be any data storage device that can store data that can be thereafter read by a computer system. Examples of the computer readable recording medium may include read-only memory (ROM), random-access memory (RAM), CD-ROMs, DVD±ROM, DVD-RAM, magnetic tapes, floppy disks, optical data storage devices. The computer readable recording medium may also be distributed through network coupled computer systems so that the computer readable code is stored and executed in a distribution fashion.

Any reference in this specification to "one embodiment," "an embodiment," "example embodiment," etc., means that a particular feature, structure, or characteristic described in connection with the embodiment is included in at least one embodiment of the invention. The appearances of such phrases in various places in the specification are not necessarily all referring to the same embodiment. Further, when a particular feature, structure, or characteristic is described in connection with any embodiment, it is submitted that it is within the purview of one skilled in the art to effect such feature, structure, or characteristic in connection with other ones of the embodiments.

Although embodiments have been described with reference to a number of illustrative embodiments thereof, it should be understood that numerous other modifications and embodiments can be devised by those skilled in the art that will fall within the spirit and scope of the principles of this disclosure. More particularly, various variations and modifications are possible in the component parts and/or arrangements of the subject combination arrangement within the scope of the disclosure, the drawings and the appended claims. In addition to variations and modifications in the component parts and/or arrangements, alternative uses will also be apparent to those skilled in the art.

What is claimed is:

1. A mobile terminal, comprising:
    a first communication module configured to establish a first communication link with a data storage device;
    a second communication module configured to establish a second communication link with an external electronic device;
    a third communication module configured to establish a third communication link with the external electronic device; and
    a controller configured to:
    receive first link configuration information from the data storage device through the first communication link,
    control the second communication module to establish the second communication link with the external electronic device by using the first link configuration information,
    share second link configuration information with the external electronic device through the second communication link, and
    control the third communication module to establish the third communication link with the external electronic device by using the shared second link configuration information.

2. The mobile terminal as claimed in claim 1, wherein when a distance to the data storage device is shorter than a predetermined distance, the controller controls the first communication module so that the first communication module establishes the first communication link with the data storage device.

3. The mobile terminal as claimed in claim 1, wherein at least one of the second communication link and the third communication link has a wider communication range than the first communication link.

4. The mobile terminal as claimed in claim 1, wherein at least one of the second communication link and the third communication link has a wider bandwidth than the first communication link.

5. The mobile terminal as claimed in claim 1, wherein the controller selectively deactivates at least one of the second communication link and the third communication link based on a power state of the mobile terminal.

6. The mobile terminal as claimed in claim 1, wherein:
    the data storage device is a Near Field Communication (NFC) tag, and
    the first communication link is an NFC link.

7. A mobile terminal, comprising:
    a first communication module configured to establish a first communication link with a data storage device;
    a second communication module configured to establish a second communication link with an external electronic device;
    a third communication module configured to establish a third communication link with the external electronic device; and
    a controller configured to control the second communication module so that the second communication module establishes the second communication link by using first link configuration information received from the data storage device through the first communication link and to then share second link configuration information for establishing the third communication link with the external electronic device through the second communication link, wherein:
    the first link configuration information comprises information about a first matching communication module of the external electronic device which corresponds to the second communication module, and
    the controller controls the second communication module so that the second communication module transmits a first handover request message to the first matching communication module based on the information about the first matching communication module.

8. The mobile terminal as claimed in claim 7, wherein the second communication module and the first matching communication module are Bluetooth communication modules.

9. The mobile terminal as claimed in claim 7, wherein:
    the second link configuration information comprises information about the third communication module, and
    the controller controls the third communication module so that the third communication module establishes the third communication link in response to a second handover request message received from a second matching communication module of the external electronic device which corresponds to the third communication module.

10. The mobile terminal as claimed in claim 9, wherein the third communication module and the second matching communication module are Wi-Fi communication modules.

11. The mobile terminal as claimed in claim 7, wherein:
    the second link configuration information comprises information about a second matching communication module of the external electronic device which corresponds to the third communication module, and
    the controller transmits a second handover request message to the second matching communication module based on the information about the second matching communication module.

12. A mobile terminal, comprising:
    a first communication module configured to establish a first communication link with a data storage device;
    a plurality of second communication modules configured to establish a plurality of second communication links with an external electronic device; and
    a controller configured to:
    receive first link configuration information from the data storage device through the first communication link,
    control one of the plurality of second communication modules to establish one of the plurality of second communication links with the external electronic device by using the first link configuration information, and
    control the remaining second communication modules besides the controlled one of the second communication modules to sequentially establish the remaining second communication links besides the established one of the second communication links according to a predetermined order of priority.

13. The mobile terminal as claimed in claim 12, wherein the controller shares second link configuration information, used to establish the remaining second communication links through the established second communication link, with the external electronic device.

14. The mobile terminal as claimed in claim 13, wherein when a distance to the data storage device is shorter than a predetermined distance, the controller controls the first communication module so that the first communication module establishes the first communication link with the data storage device.

15. The mobile terminal as claimed in claim 13, wherein at least one of the plurality of second communication links has a wider communication range than the first communication link.

16. The mobile terminal as claimed in claim 13, wherein at least one of the plurality of second communication links has a wider bandwidth than the first communication link.

17. The mobile terminal as claimed in claim 13, wherein the controller deactivates second communication links other than at least one of the plurality of second communication links based on a power state of the mobile terminal.

18. A mobile terminal, comprising:
a first communication module configured to establish a first communication link with a data storage device;
a plurality of second communication modules configured to establish a plurality of second communication links with an external electronic device; and
a controller configured to establish one of the plurality of second communication links based on first link configuration information received from the data storage device through the first communication link and then sequentially establishing the remaining second communication links of the plurality of second communication,
wherein the controller shares second link configuration information, used to establish the remaining second communication links through the established second communication link, with the external electronic device,
wherein:
the first link configuration information comprises information about a first matching communication module of the external electronic device which corresponds to one of the plurality of second communication modules, and
the controller controls the one second communication module so that the one second communication module transmits a first handover request message to the first matching communication module based on the information about the first matching communication module.

19. The mobile terminal as claimed in claim 18, wherein:
the second link configuration information comprises information about a second communication module used to establish the remaining second communication links, and
the controller establishes the remaining second communication links in response to a second handover request message received from a second matching communication module of the external electronic device which corresponds to the second communication module used to establish the remaining second communication links.

20. The mobile terminal as claimed in claim 18, wherein:
the second link configuration information comprises information about a second matching communication module of the external electronic device which is used to establish the remaining second communication links, and
the controller transmits a second handover request message to the second matching communication module based on the information about the second matching communication module.

* * * * *